(12) United States Patent
Fikse

(10) Patent No.: US 6,186,604 B1
(45) Date of Patent: Feb. 13, 2001

(54) TRACTOR ENDLESS TREAD

(76) Inventor: Tyman H. Fikse, 732 Tillamook St., LaConner, WA (US) 98257

( * ) Notice: Under 35 U.S.C. 154(b), the term of this patent shall be extended for 0 days.

(21) Appl. No.: 09/170,931

(22) Filed: Oct. 13, 1998

Related U.S. Application Data

(63) Continuation-in-part of application No. 09/017,998, filed on Feb. 3, 1998, which is a continuation-in-part of application No. 08/666,941, filed on Jun. 19, 1996, now Pat. No. 5,741,052.

(51) Int. Cl.⁷ ................................................. B52D 55/26
(52) U.S. Cl. ......................... 305/181; 305/160; 305/170; 305/180
(58) Field of Search ................................. 305/165, 167, 305/170, 171, 172, 173, 174, 175, 176, 177, 181, 160, 161, 162, 180, 40

(56) References Cited

U.S. PATENT DOCUMENTS

| | | | |
|---|---|---|---|
| 2,107,490 | * 2/1938 | Mayne | 305/172 |
| 3,700,288 | * 10/1972 | Davin et al. | 305/181 X |
| 4,241,956 | * 12/1980 | Meisel, Jr. | 305/181 |
| 4,645,274 | * 2/1987 | Wohlford | 305/180 X |
| 5,295,741 | * 3/1994 | Togashi et al. | 305/171 X |
| 5,741,052 | * 4/1998 | Fikse | 305/181 X |
| 6,030,057 | * 2/2000 | Fikse | 305/180 X |

FOREIGN PATENT DOCUMENTS

| | | | |
|---|---|---|---|
| 4-342680 | * 11/1992 | (JP) | 305/177 |
| 5-221345 | * 8/1993 | (JP) | 305/177 |
| 1181929 | * 9/1985 | (SU) | 305/172 |
| 93-22184 | * 11/1993 | (WO) | 305/171 |

* cited by examiner

Primary Examiner—Russell D. Stormer
(74) Attorney, Agent, or Firm—Robt. W Beach

(57) ABSTRACT

Two endless wire rope loops spaced lengthwise of elongated grouser-mounting base plates of a tractor endless tread are secured to the grouser-mounting base plates by spaced U-shaped bows of clamping strips bolted to the grouser-mounting base plates, and the adjacent edges of adjacent clamping strips have interfitting projections and sockets for transmitting shear forces between such adjacent clamping strips.

5 Claims, 26 Drawing Sheets

TRACTOR ENDLESS TREAD

RELATED APPLICATION

This application is a continuation-in-part of application Ser. No.09/017,998, filed Feb. 3, 1998, which is a continuation-in-part of application Ser. No. 08/666,941, filed Jun. 19, 1996, for Tractor Endless Tread, which issued as U.S. Pat. No. 5,741,052 on Apr. 21, 1998.

BACKGROUND OF THE INVENTION

1. Field of the Invention

This invention relates to a tractor endless tread composed of grouser-mounting base plates strung on twin endless strings, each string including a pair of side-by-side wire rope stretches filled with elastomer material and embedded in elastomer material.

2. Prior Art

A tractor endless tread having grousers strung on cables is disclosed in Fikse U.S. Pat. No. 3,063,758, issued Nov. 13, 1962, for Strung Section Flexible Band Vehicle Track. The structure of the present tread is simplified and is more durable.

The Myers U.S. Pat. No. 2,326,719, issued Aug. 10, 1943, and the Keck U.S. Pat. No. 2,392,988, issued Jan. 15, 1946 show vehicle tracks incorporating cables embedded in rubber, but the structure of these tracks is quite different from the track of the present invention.

SUMMARY OF THE INVENTION

A principal object of the invention is to provide a string of rigid grouser-mounting base plates forming an endless band which are interconnected by wire rope loops that are protected against fatigue.

A more specific object is to secure such wire rope loops to grouser-mounting base plates by elongated clamping strips which are interengaged to transmit shear stress between adjacent clamping strips.

A further object is to improve the flexibility of the wire rope loops by embedding the wire rope in elastomer material.

It is also an object to provide an endless tractor tread having rigid grouser-mounting base plates strung on a wire rope loop in a construction which will enable individual grouser-mounting base plates to be removed easily from the tread and replaced with substitute grouser-mounting base plates.

Another object is to provide flexible joints between adjacent grouser-mounting base plates of an endless band of grouser-mounting base plates forming a tractor tread.

More specifically, it is an object to provide interfitting projection and socket joints between adjacent grouser-mounting base plates.

An additional object is to provide an endless band of grouser-mounting base plates in which the grouser-mounting base plates may be of different selected lengths.

The foregoing objects can be accomplished by a tractor tread including a band of elongated grouser-mounting base plates connected together by two wire rope loops spaced apart lengthwise of the grouser-mounting base plates a distance several times as great as the width of a grouser-mounting base plate, each loop being composed of two side-by-side wire rope stretches embedded in elastomer material, which loops are secured to the grouser-mounting base plates by clamping strips engaging the wire rope loops. The adjacent edges of adjacent clamping strips have interfitting projections and sockets for transmitting shear stress between adjacent clamping strips.

DETAILED DESCRIPTION

The tractor tread of the present invention can be used on various caterpillar-type tractors, Caterpillar being defined in *Webster's Third New International Dictionary* as:

a trademark used for a tractor made for use on rough or soft ground and moved on two endless metal belts.

The definition of a "caterpillar tread" is given as
   the endless chain belt on which a caterpillar-type vehicle runs.
A "tractor" is defined as
   2 an apparatus or device for the draught or sometimes propulsion of another body, . . . b (1) a four-wheeled or caterpillar tread rider-controlled automotive vehicle used especially for drawing agricultural or other implements or for bearing and propelling such implements In the present application, the designation "tractor tread" is intended to refer to an endless tread suitable for use on a caterpillar-type tractor.

Figure 1:
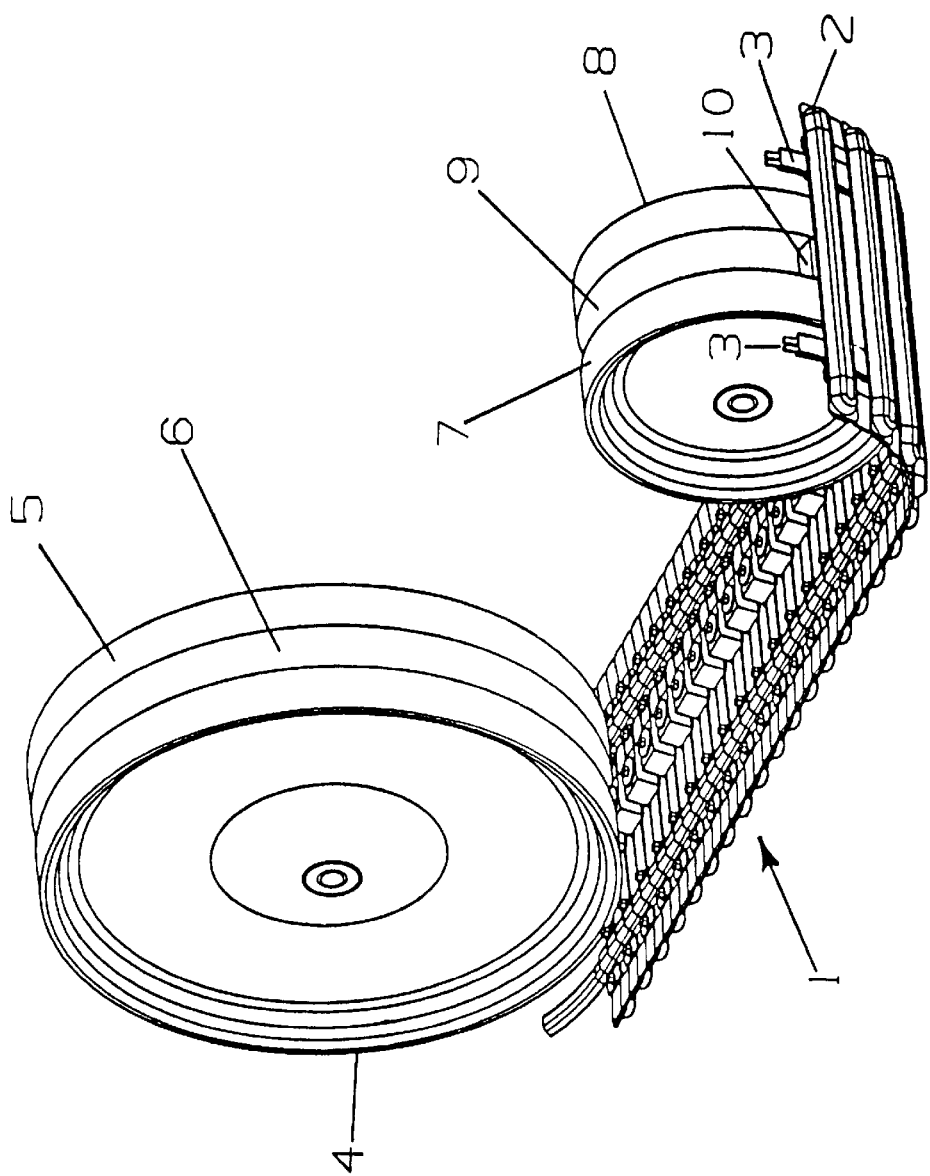
FIG. 1 is a fragmentary top perspective of a portion of a tractor and a portion of a tractor endless tread according to the present invention.

It is preferred that the tread of the present invention be used on tractors having large driving wheels and small idler wheels carrying the tread, as shown in FIG. 1, but treads of the type of the present invention could be used on other caterpillar-type vehicles, the arrangement shown in FIG. 1 being merely illustrative.

In FIG. 1, the tread 1 is composed of grousers 2 strung on loops 3 embodying wire rope to form endless loops. The tractor has large coaxial drive wheels 4 and 5 spaced apart transversely to provide an annular groove 6 between them. The smaller idler wheels 7 and 8 also are coaxial and have between them an annular groove 9. The purpose of the grooves 6 and 9 is to provide guidance and transverse stability for the tread by coacting with guide blocks 10 on the tread which are received in the grooves 6 and 9 when the tread travels around the driving wheels and the idler wheels.

Figure 2:
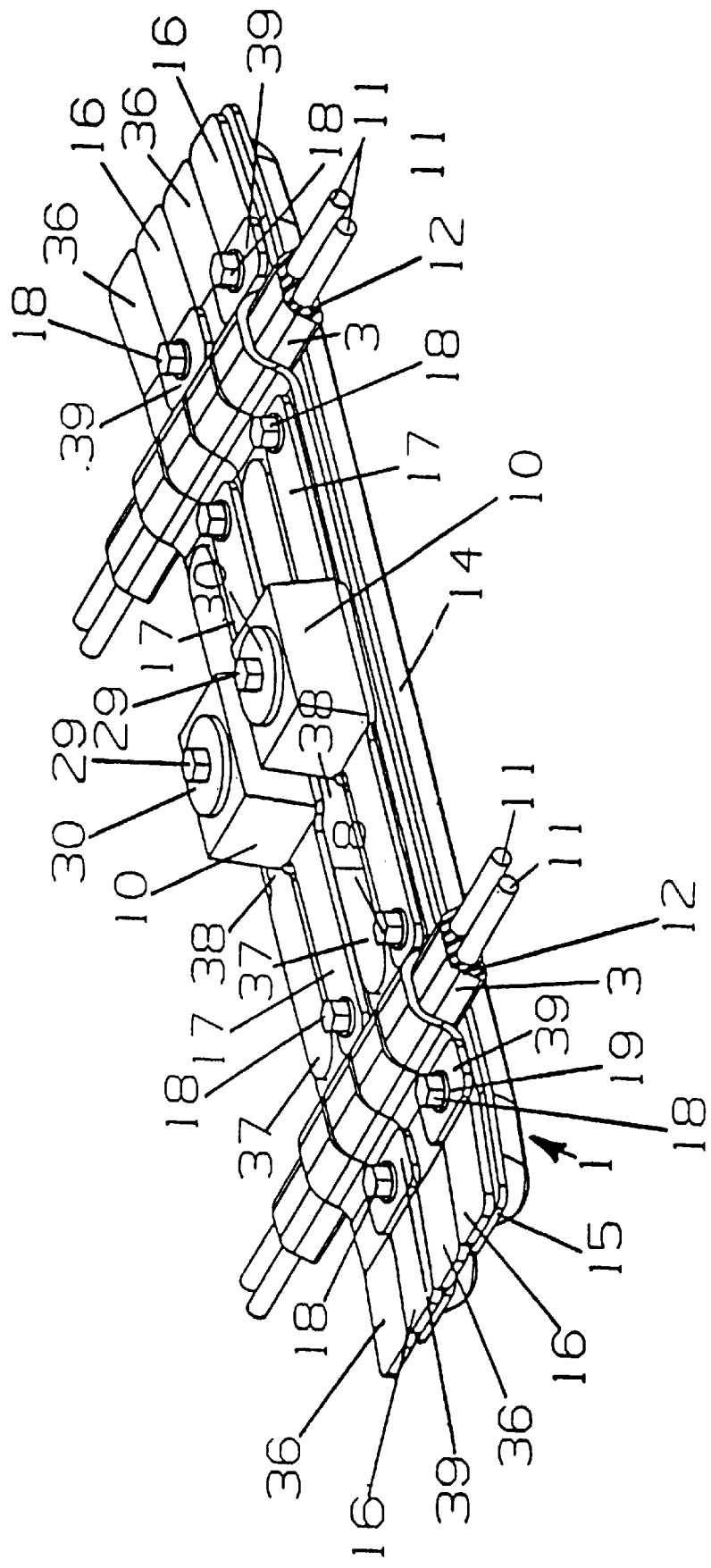
FIG. 2 is an enlarged top perspective of a portion of the tread of the present invention.
Figure 3:
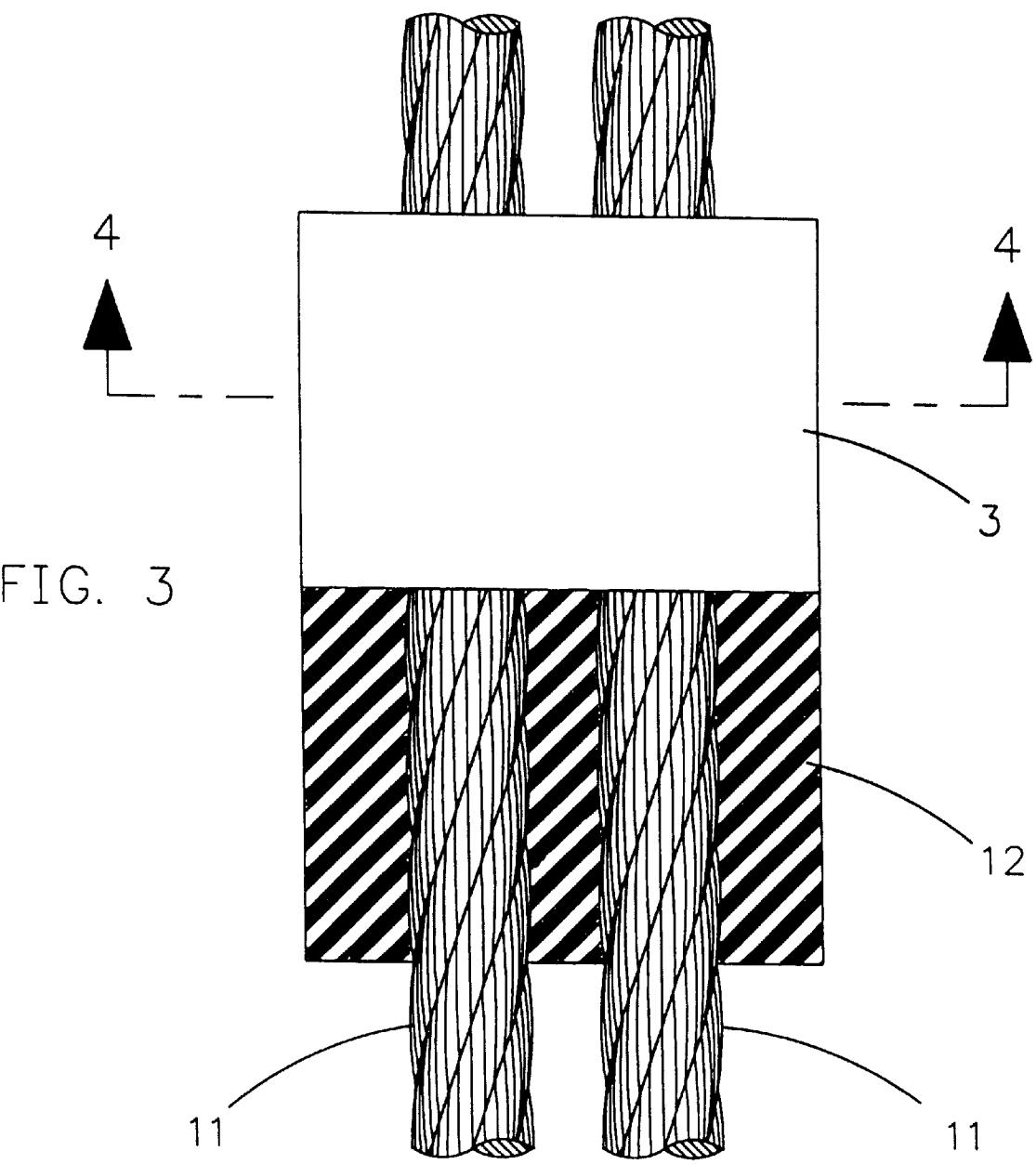
FIG. 3 is a plan of a portion of a wire rope loop forming part of the tread of the present invention, parts being broken away.
Figure 4:
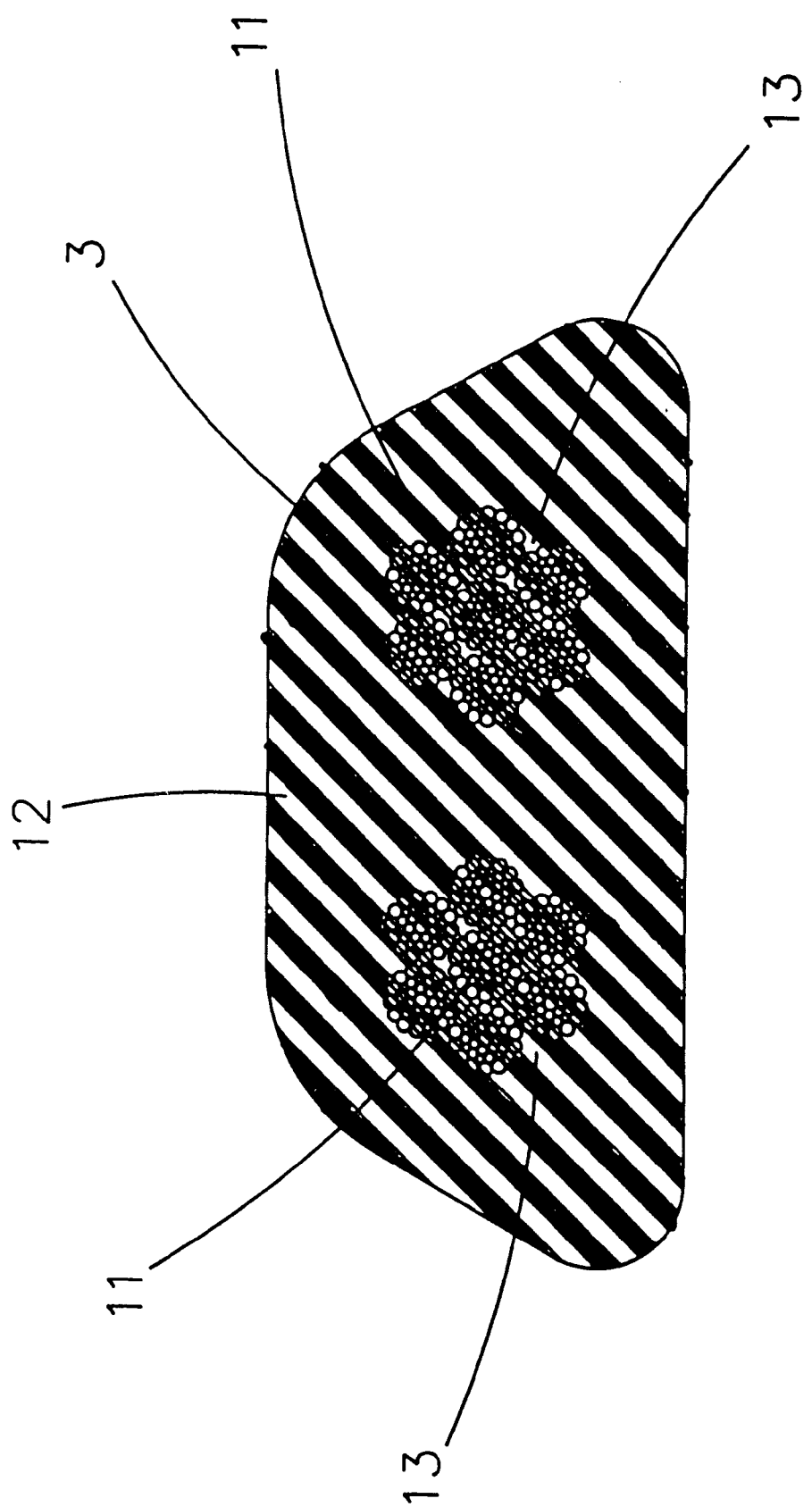
FIG. 4 is a transverse section through the wire rope loop taken on line 4—4 of FIG. 3 shown on an enlarged scale.

FIG. 2 is a detailed top perspective of a portion of the tread showing the manner in which the wire rope endless loops 3 are assembled with the various components of the tread. A key feature of the tread is the structure of the grouser-connecting wire rope endless loops 3 which is shown in detail in enlarged FIGS. 3 and 4. Each grouser-carrying loop 3 includes one, and preferably two, wire rope endless loops 11 embedded in an encasement 12 of elastomer material. The stretches of the doubled wire rope are arranged in side-by-side relationship as shown in FIGS. 3 and 4 to provide a generally flat embedment.

The wire ropes 11 are filled with elastomer material, that is, the interstices between and around the helically twisted strands of the wire rope including the exterior crevices 13 are filled with such material. Such filled wire rope is embedded in the elastomer encasement 12 as shown in FIGS. 3 and 4. This treatment of the wire rope increases greatly its fatigue life as the grouser-connecting wire rope loops flex during travel around the arcs of the loop established by the tractor wheels. The embedment also provides support for the wire rope loop as it travels around the arcs of the tractor wheels without appreciably decreasing the flexibility of the wire rope.

Figure 5:
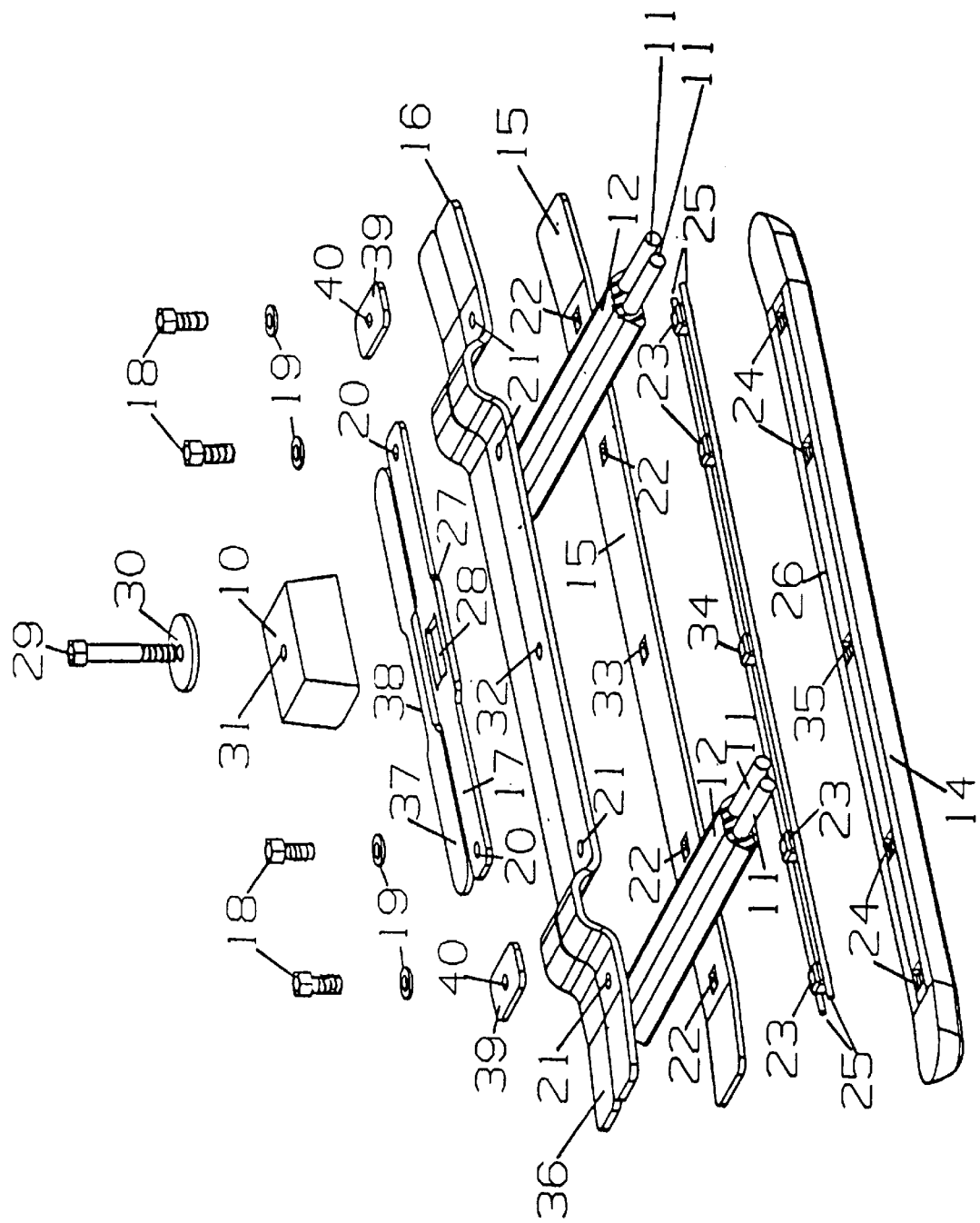
FIG. 5 is a top perspective of the tread retaining structure for integrating the grousers and grouser-connecting wire rope loops, parts being shown in exploded relationship.

The wire rope loops 3 are integrated with the tractor tread grousers in the manner indicated in FIG. 2 by the components of the integrating structure shown exploded in FIG. 5 and in specific assembled relationships shown in FIGS. 2, 6, 7, 8, 9 and 10.

The grousers 2 are composed of bars 14 of relatively hard elastomer material, such as medium hard rubber, which are bonded to the elongated grouser-mounting base plates 15, the lengths of which are a considerable number of times as great as the widths of the plates, such as the length of a grouser-mounting base plate being twenty to forty times as great as its width.

Stretches of two wire rope loops 3 overlie the grouser-mounting base plates 15 extending transversely thereof and located in spaced relationship a distance a considerable number of times as great as the width of a grouser-mounting base plate, such as ten to twenty times the width of a grouser-mounting base plate. The stretches of wire rope loop embedments are secured to each grouser-mounting base plate in such positions by the generally U-shaped bows in an elongated clamping strip 16 extending between and connecting such bows to form an integral clamping strip including such two bows of substantially uniform thickness throughout its length overlying the grouser-mounting base plate and the two wire rope loops.

The cross section of a wire rope loop embedment is of truncated equilateral triangular shape with rounded corners, including a wider side and an opposite narrower side with substantially flat opposite embedment edges joining the opposite embedment sides, converging away from the wider embedment side and toward the narrower embedment side. Each clamping strip bow portion embraces the narrower side, the convergent edges and rounded corners of the wire rope loop embedment so that its sweep is easy to eliminate pronounced stress-concentration points.

The central portion of each clamping strip 16 is reinforced by a stiffening strip 17 that overlies the portion of the clamping strip 16 between the U-shaped loop clamping portions. The stiffening strip 17, the clamping strip 16 and the grouser-mounting base plate 15 are secured rigidly together by securing bolts 18 which pass in succession outward through washers 19, apertures 20 in the stiffening strip 17, apertures 21 in the clamping strip 16, and apertures 22 in the grouser-mounting base plate 15.

The securing bolts are screwed into nuts 23 which can be received in recesses 24 in the grouser bar 14. The nuts 23 are secured between and welded to two nut-holding rods 25 arranged parallel to the grouser-mounting base plate 15 and spaced apart so that the nuts cannot turn as the bolts 18 are tightened. The rods 25 can be received in a groove or grooves 26 in the grouser bar 14 as shown in FIGS. 7, 8, 9 and 10. Tightening of the bolts 18 at each side of an endless loop draws a bow of a clamping strip 16 toward its grouser-mounting base plate 15 to force the bow into firm engagement with the inwardly converging edges of the wire rope embedment of the loop causing such edges to exert a wedging action on the clamping bow to anchor the endless loop 3 securely to the grouser-mounting base plate.

A rectangular aperture 28 in the central portion of the stiffening strip 17, which is widened, can receive a downward projection of complemental rectangular shape on the bottom of the guide block 10 to locate it relative to the grouser-mounting structure and to prevent the guide block from pivoting relative to such structure. The guide block is held in position relative to the grouser-mounting structure by a bolt 29 passing successively through a washer 30, an aperture 31 in the guide block 10, an aperture 32 in the clamping strip 16 and an aperture 33 in the grouser-mounting base plate 15. The threaded end of the bolt 29 can be screwed into a nut 34 received in the recess 35 of the grouser bar 14 and held between and welded to the nut-holding rods 25. When the bolt 29 is tightened, it will secure the guide block 10 to the grouser-mounting structure and grouser-connecting wire rope loops 3.

The grouser bar 14 can be bonded to the grouser-mounting base plate 15 either at this point in the assembly of the tread structure or before assembly of the grouser-mounting base plate 15 with the other components of the tread above it as described. In either case, however, it is essential that the nuts 23 and 34 and the nut-holding rods 25 be received in the recesses in the grouser bar 14 before it is bonded to the grouser-mounting base plate 15.

Figure 7:
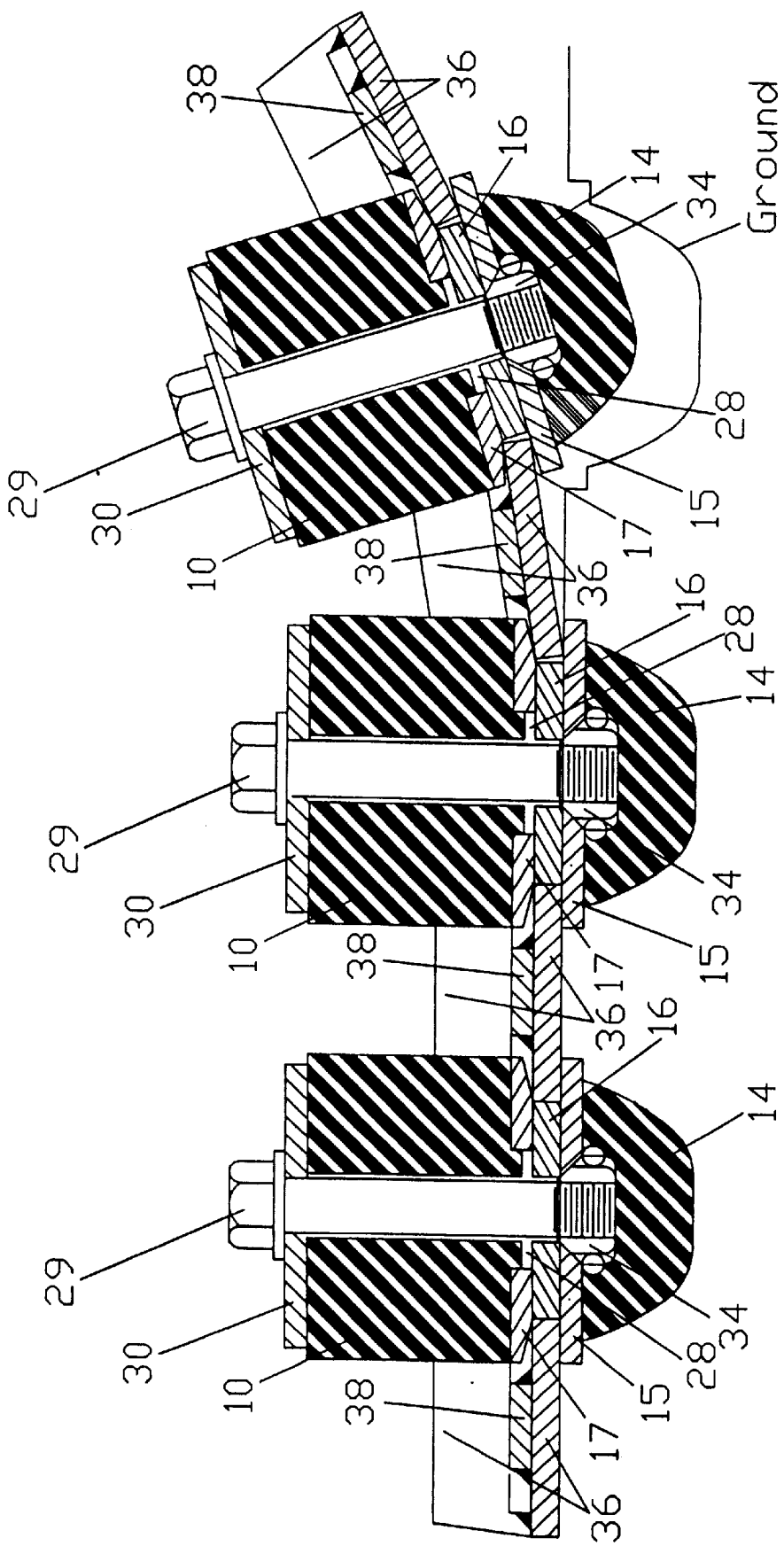
FIGS. 7, 8, 9 and 10 are sections through the tread assembly shown in FIG. 6 taken on lines 7—7, 8—8, 9—9 and 10—10, respectively, of that figure.

The relative tilting of the guide blocks 10 as the tread travels around the mounting wheels of the tractor reduces the clearance between their inner ends as compared with the guide block spacing along the straight stretches of the tread between the drive wheels 4, 5 and idler wheels 7, 8 as shown in FIG. 7. It is desirable for the grousers 2 to be spaced apart lengthwise of the tread a reasonable distance, such as by a spacing somewhat less than the width of the grouser-mounting base plates 15.

Figure 8:
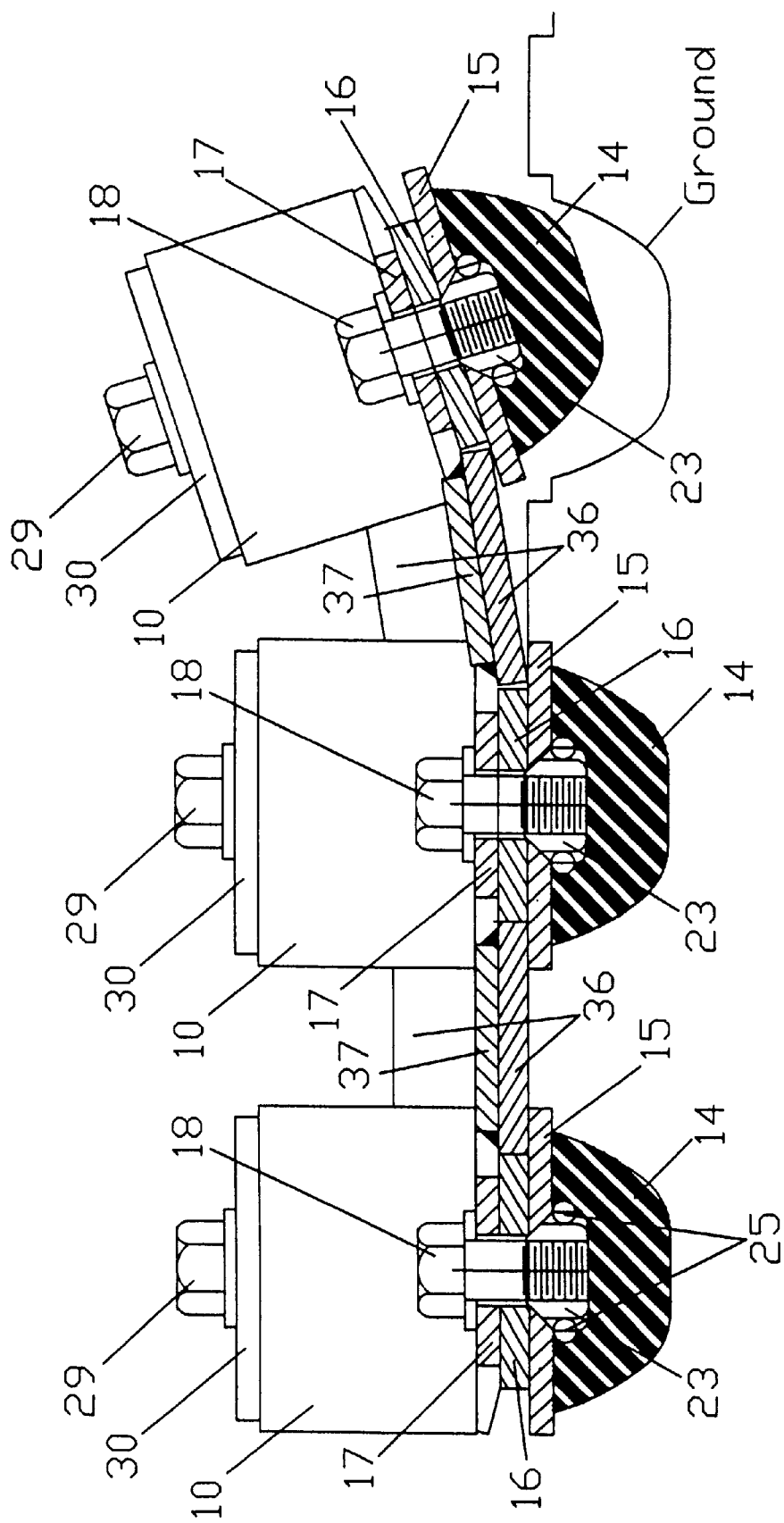

Spacing of the grouser-mounting base plates 15 is assured by intermediate spacer strips 36 located alternately between and bridging between the wire rope clamping strips 16, as shown in FIG. 2. These spacer strips are floating between the clamping strips. They are held against appreciable movement transversely of the tread by generally U-shaped bends or bows similar to the U-shaped bows in the clamping strips 16 embracing the wire rope loops 3. Movement of the spacer strips 36 lengthwise of the track is limited by assembling such strips with the grouser-mounting base plates 15 and clamping strips 16 by loose tongue-and-groove joints offset from the endless loops 3, as shown in FIGS. 7, 8 and 10.

The floating intermediate spacer strips 36 form tongues of the tongue-and-groove joints. As shown in FIGS. 7 and 8, the intermediate spacer strips are disposed coplanar with the central portions of the clamping strips 16 between their loop-engaging bends. The intermediate spacer strips and the clamping strips are of substantially equal thickness as shown in FIGS. 7 and 10. The edges of such floating spacer strips 36 form tongues which fit into grooves formed between the grouser-mounting base plates 15 and the wider central portions of the stiffening strips 17 at the opposite sides of apertures 28 as shown in FIG. 7. As shown in FIGS. 7, 8 and 10, the grouser-mounting base plates are wider than the clamping strips 16 so that their opposite margins provide ledges forming the outer sides of the grooves engageable by the tongue-forming intermediate spacer strips 36 as shown in FIGS. 7, 8 and 10.

The width of the widened central portions of stiffening strips 17 is approximately equal to the width of the grouser-mounting base plates 15 as shown in FIG. 7 so that the opposite margins of these central portions overhang the margins of the adjacent intermediate spacer strips 36 and form the inner sides of the tongue-and-groove joint grooves. The clamping strips 16 form the bottoms of such grooves. These joints are located between the two endless loops 3. The under edges of the widened central portions of the stiffening strips are beveled or chamfered as shown in FIG. 7 to accommodate relative tilting between such stiffener strips and the intermediate spacer strips 36 as the tread rounds the tractor wheels to enable the tread to flex locally in one direction. The opposite or outer margins of the grouser-mounting base plates 15 are not beveled or chamfered so that the tread is substantially inflexible in the opposite direction. Thus, even though the straight portion of the tread between the tractor wheels rides over a hump during travel of the tractor, that portion of the tread will not be bowed upward appreciably but will be maintained substantially planar.

Figure 10:
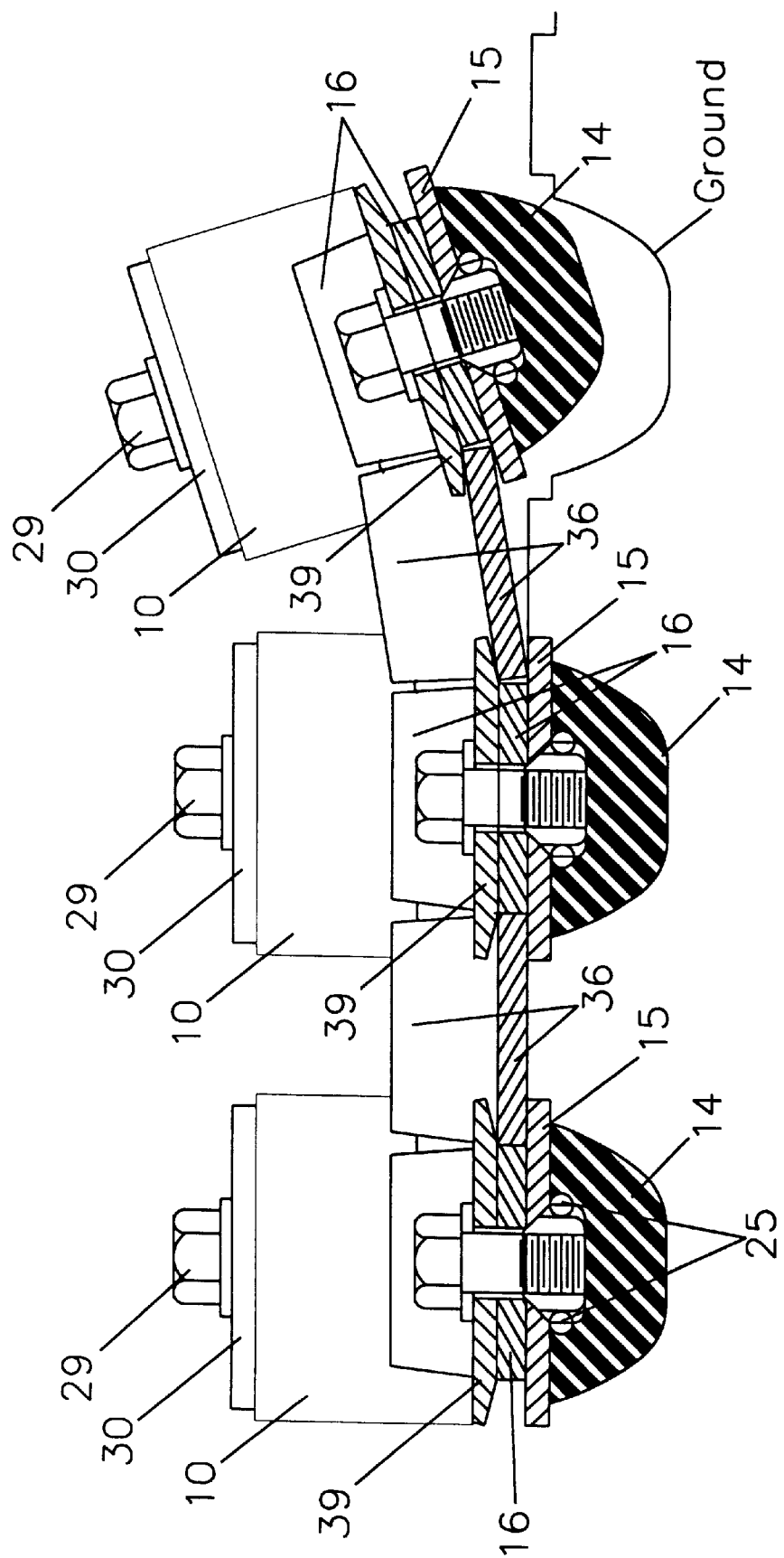
Figure 11:
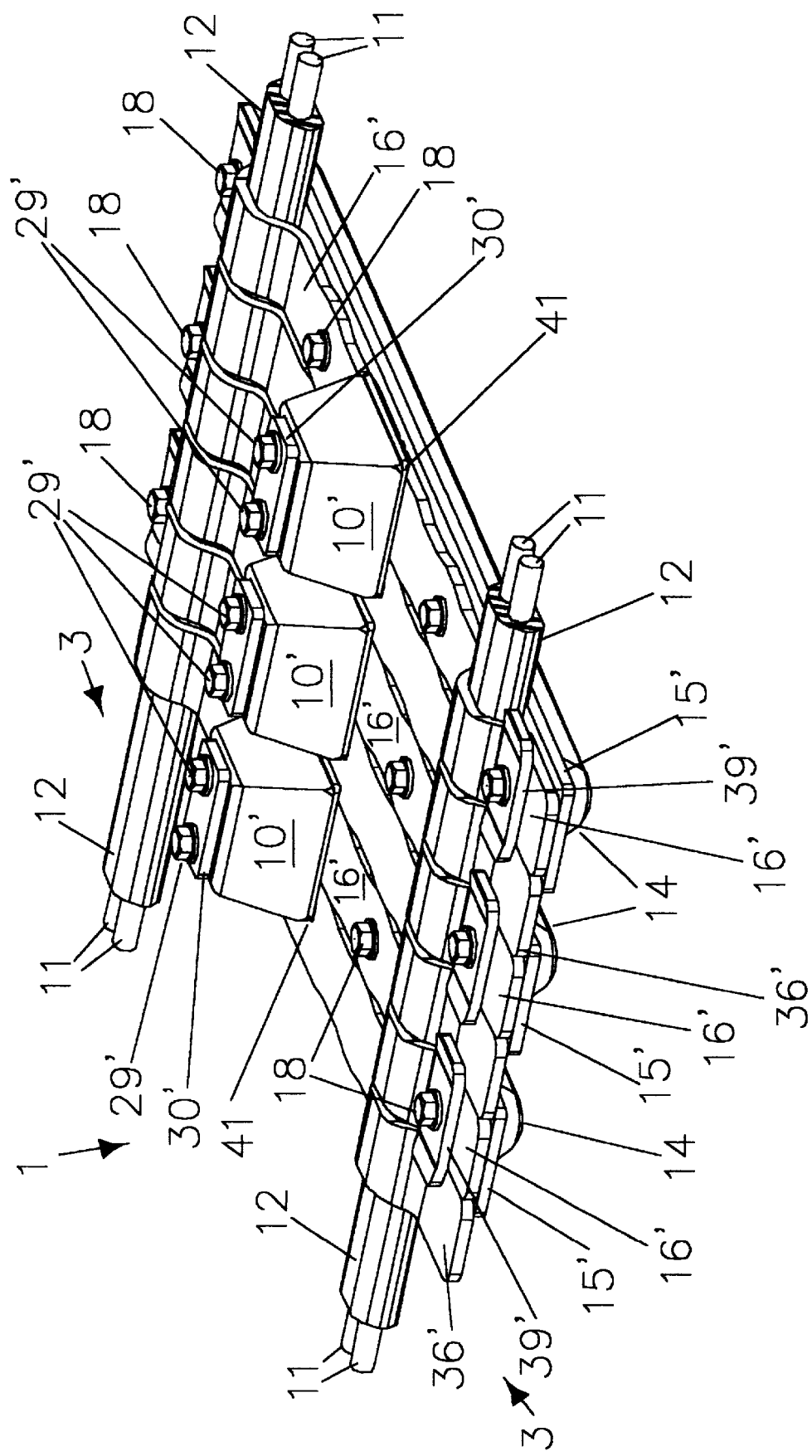
FIG. 11 is a top perspective of a section of the tractor tread having a somewhat modified structure.

Additional loose tongue-and-groove joints are formed at the side of each endless loop 3 remote from the other endless loop between the intermediate spacer strips 36 and the outer end portions of the clamping strips 16 by short crosspieces 39 mounted overlying the clamping strips 16 at locations outward of the U-shaped wire rope loop clamping bows by providing a hole 40 in each crosspiece through which a bolt 18 extends, as shown in FIG. 10. The opposite margins of the outer end portions of the spacer strips 36 constitute the tongues of such additional joints and the grooves receiving such tongues are formed by the end portions of the crosspieces 39, the margins of the grouser-mounting base plates 15 and the clamping strips 16 as shown in FIG. 10.

The end portions of the crosspieces 39 are underbeveled or chamfered to provide the relief necessary for enabling the outer end portions of the clamping strips 16 and the intermediate spacer strips 36 to tilt relatively as the tread moves around the tractor wheels, as shown in FIG. 10. Again, as in the tongue-and-groove joints in the central portion of the grousers, the tongue-and-groove joints between the outer portions of the grouser-mounting base plates 15 and the intermediate spacer strips 36 are substantially inflexible inward because the margins of the outer portions of the grouser-mounting base plates 15 forming the outer sides of the grooves are not beveled or chamfered.

The intermediate spacer strips 36 can be stiffened by shorter strips 37 extending between the loop-engaging U-shaped bends of the spacer strips as shown in FIG. 2. The central portions 38 of stiffening strips 37 are narrowed by edge recesses so that these strips will not interfere with the guide blocks 10 or the widened central portions of the stiffening strips 17 as shown in FIG. 7. The stiffening strips 37, 38 can be secured to the spacer strips 36 by edge welding, as shown in FIG. 7 and FIG. 8.

Because the grouser-connecting wire rope loops 3 are secured to the grouser structure by clamping strips 16, individual grouser assemblies can be removed from the tread and replaced without disturbing the rest of the tread assembly. To remove a single grouser, the bolts 18 and 29 for that grouser can be removed, which will free the grouser-mounting base plate 15 from the clamping strip 16. The grouser-mounting base plate 15 and grouser bar can then be removed and replaced by a substitute grouser-mounting base plate 15 to which a new grouser bar 14 is bonded. The bolts 18 and 29 can then be replaced so that the wire rope loops 3 are clamped to the new grouser-mounting base plate 15 and grouser bar 14.

Such replacement of a grouser can be effected when the grouser bar has become worn excessively. Alternatively, such a grouser assembly can be replaced by a grouser assembly of different length. For example, one, several or all grouser assemblies can be replaced with a longer grouser assembly or assemblies without changing the spacing of the twin grouser-connecting wire rope loops 3. The longer grousers would provide greater traction or, if all the assemblies were replaced, the tread would have a greater ground contact area for decreasing the unit load of the tractor on soft ground.

As the tread travels around the path defined by the tractor wheels, dirt, particularly if its clay content is high, may tend to lodge on top of the lower straight stretch of the tread between the tractor wheels and in the spaces between the reinforcing strips 17 and the reinforcing strips 37 shown in FIGS. 2, 7, and 8. Travel of the tread around the tractor wheels effects working between the adjacent reinforcing strips 17 and 37 which scavenges such dirt as the tread bends in passing around the tractor wheels and causes such dirt to slough off.

Figure 6:
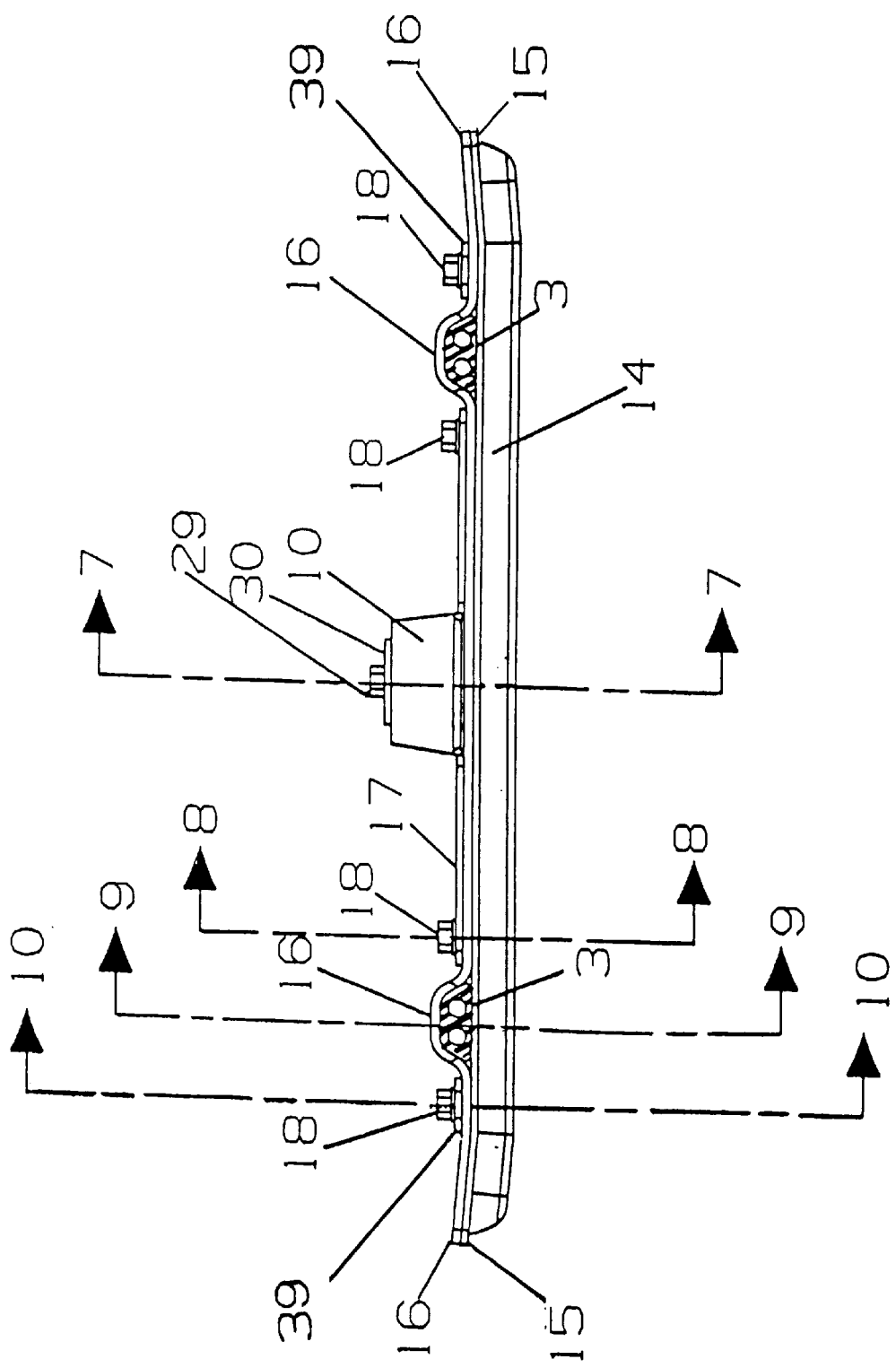
FIG. 6 is a cross section through the tractor tread showing the parts of the retaining structure of FIG. 5 in assembled relationship.

In order to reduce the tendency of the tread edges to dig into the dirt as the tractor turns, it is preferable for the end portions of the grouser assemblies to be bent up somewhat as shown in FIG. 6 so that the edge portions of the tread will slide more readily over the dirt as the tractor turns.

In the modified tractor endless tread structure shown in FIGS. 11 to 16, the stiffening strip 17 for the clamping bar 16 has been eliminated and the stiffening strip 37 for the spacer strip 36 has been eliminated. Such elimination would also eliminate the aperture 28 in the stiffening strip 17, the function of which is to prevent swiveling of a guide block 10 around the axis of the retaining bolt 29. In the modified structure of FIGS. 11, 12, 14, 15, and 16, swiveling of the guide blocks 10' is prevented by attaching them to the tread structure by twin bolts 29'. The heads of the bolts 29' bear on cap plates 30' spanning between the bolts and overlying the guide blocks 10'.

Figure 14:
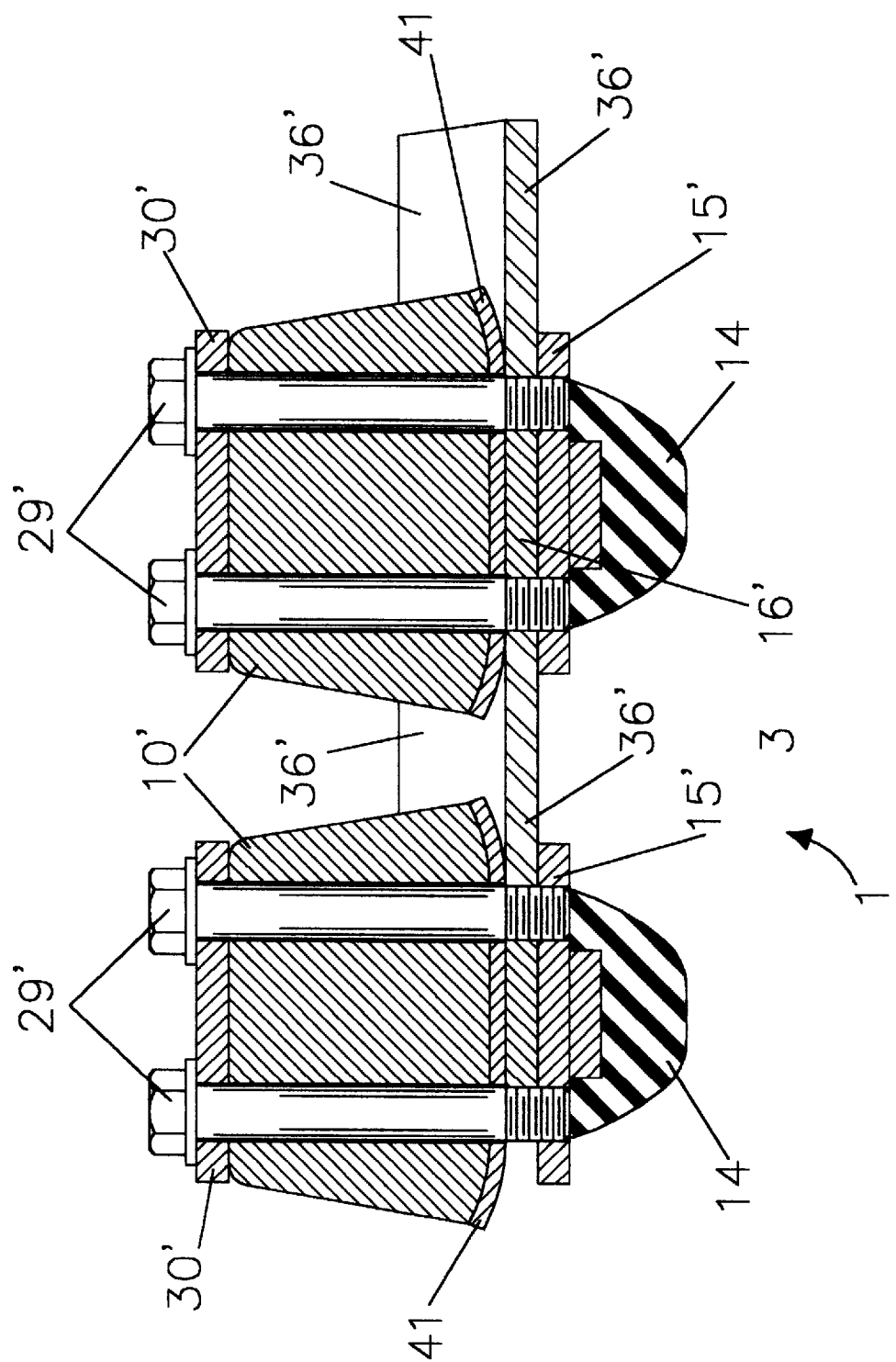
FIG. 14 is a section through the tread assembly shown in FIG. 13 taken on line 14—14 of that figure.
Figure 15:
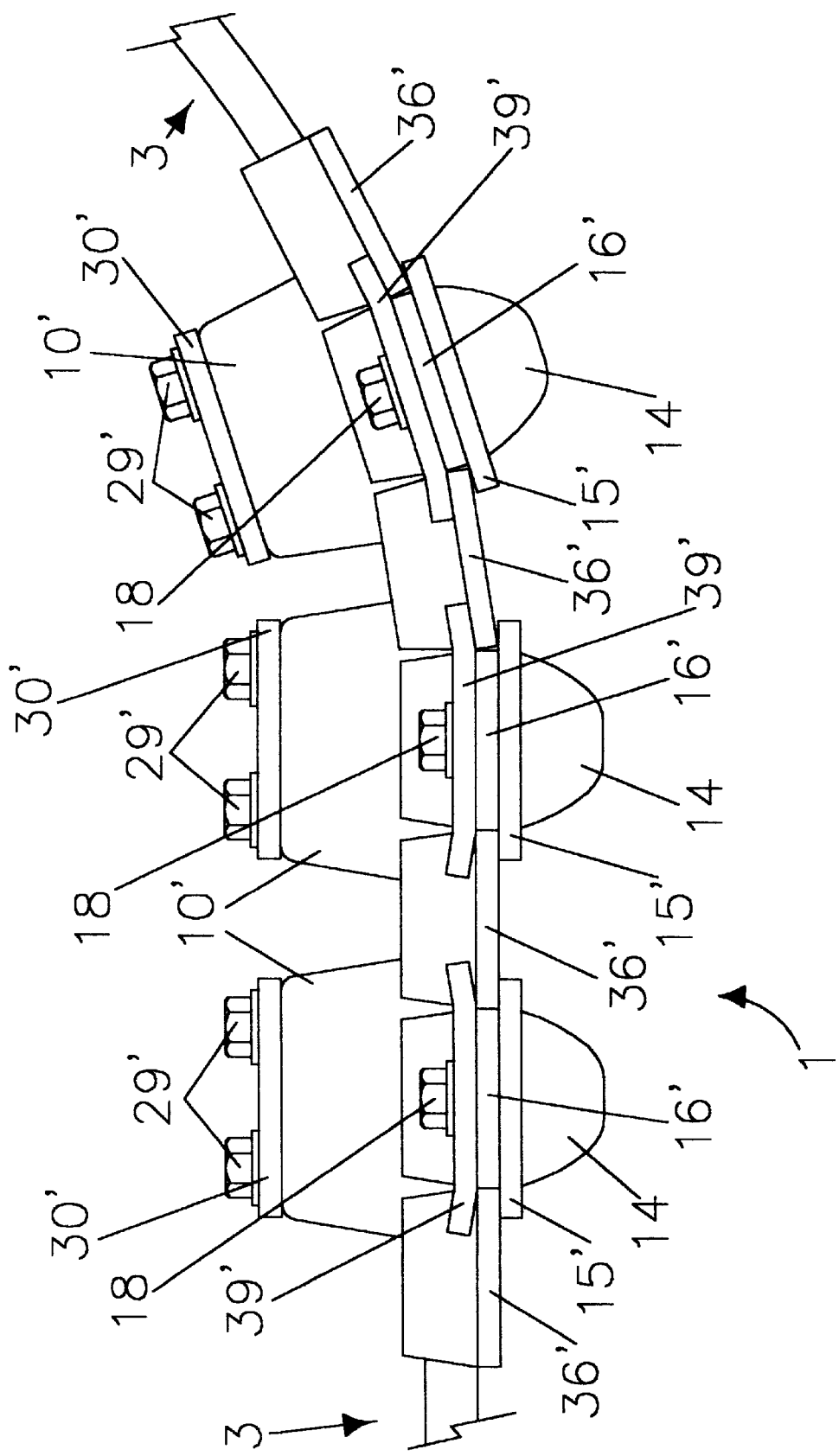
FIG. 15 is an edge elevation of the tread of FIG. 11.
Figure 16:
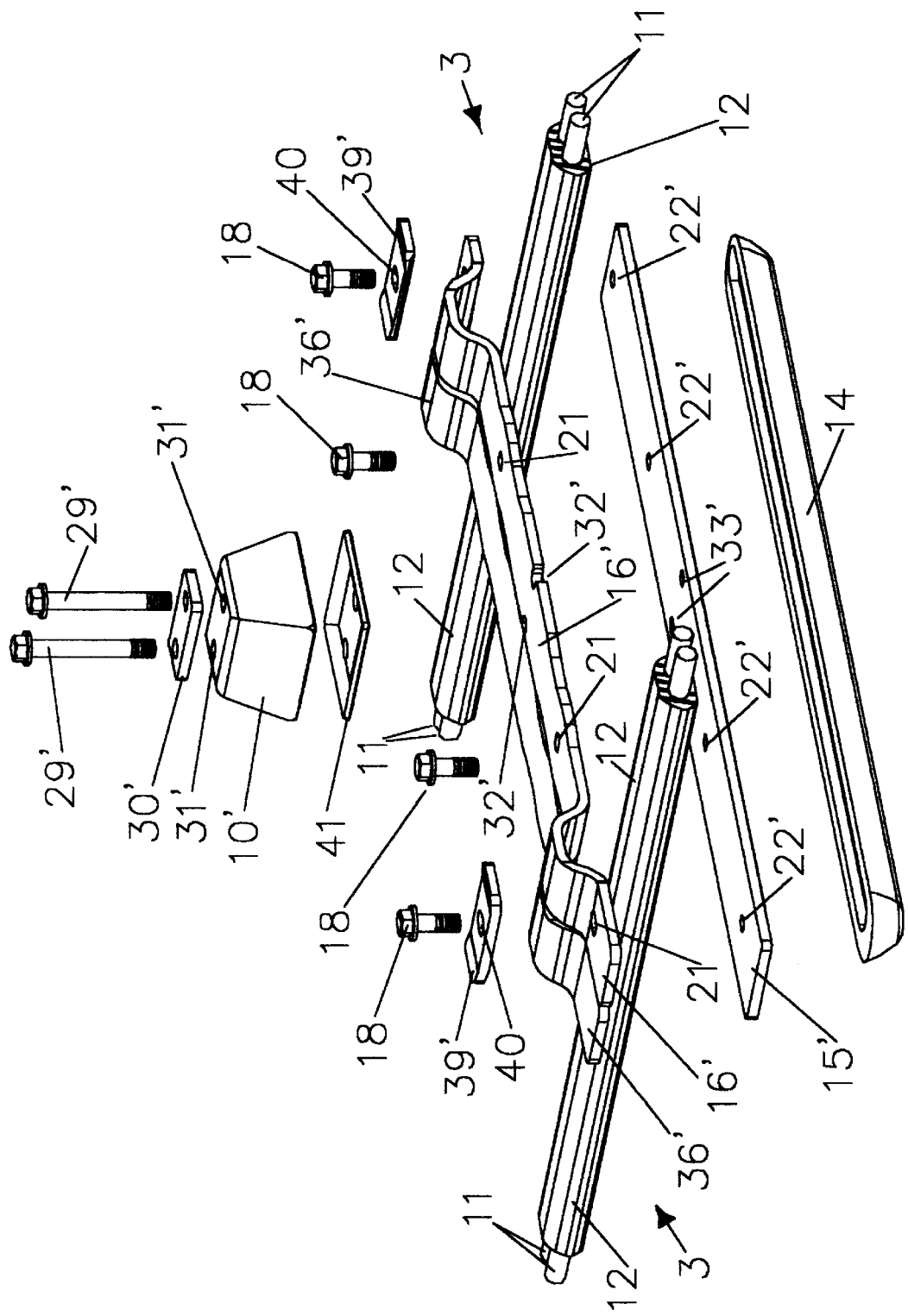
FIG. 16 is a top perspective of the tread retaining structure for integrating the grousers and grouser-connecting wire rope loops of the tread type shown in FIG. 11, parts being shown in exploded relationship.
Figure 17:
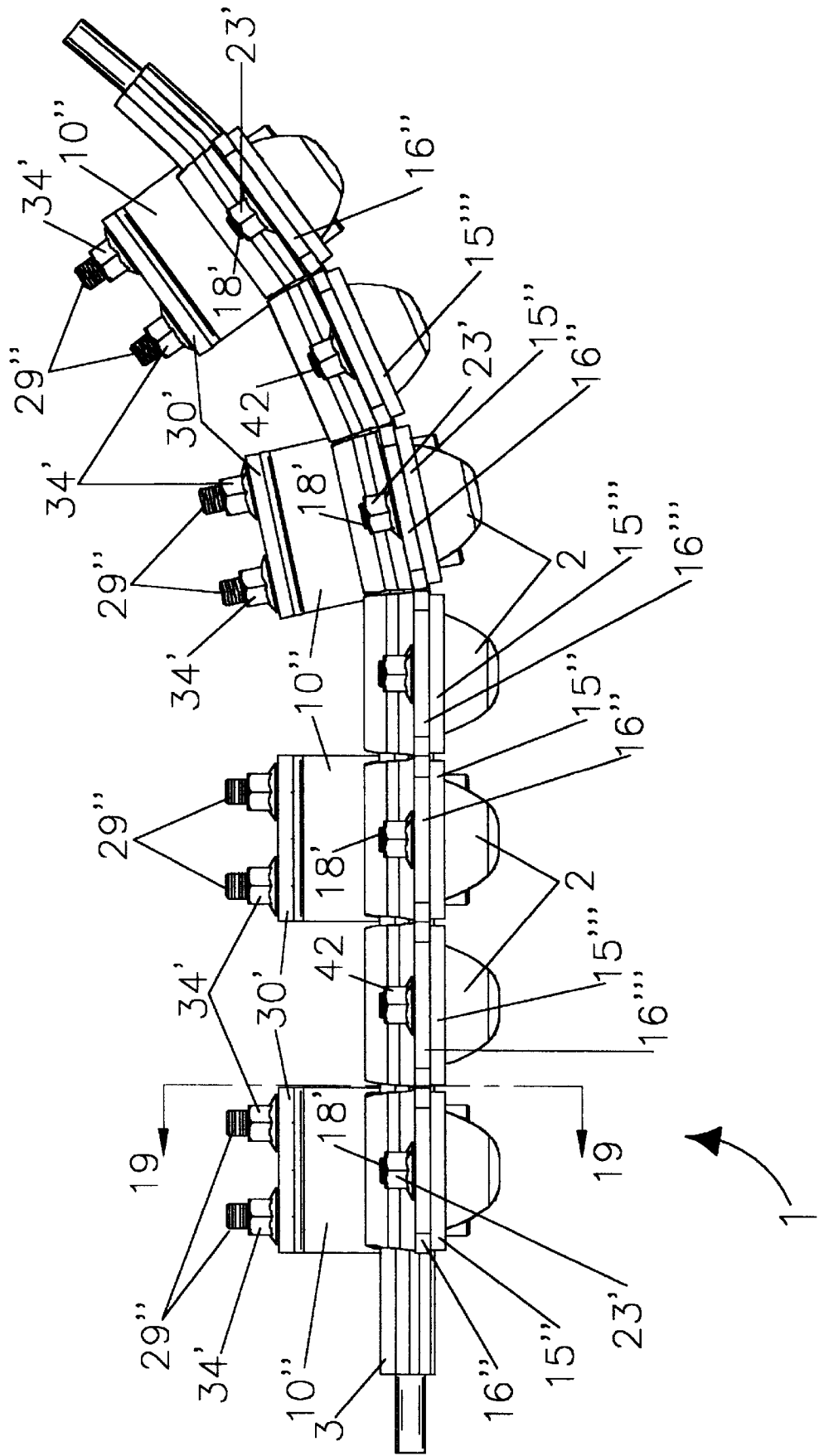
FIG. 17 is an edge elevation of a portion of a tractor tread of further modified type.
Figure 18:
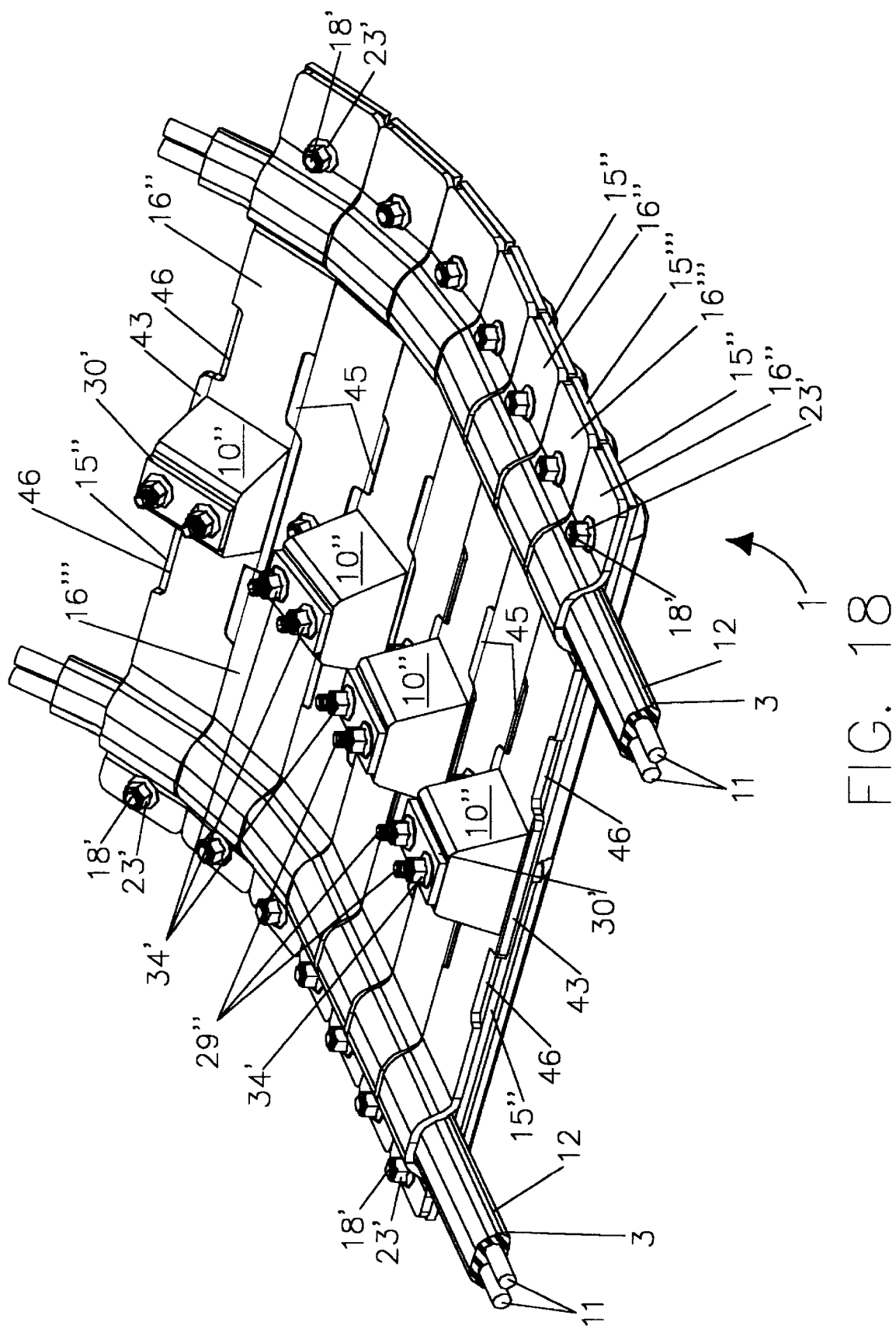
FIG. 18 is a top perspective of a section of tractor tread of the type shown in FIG. 17.
Figure 19:
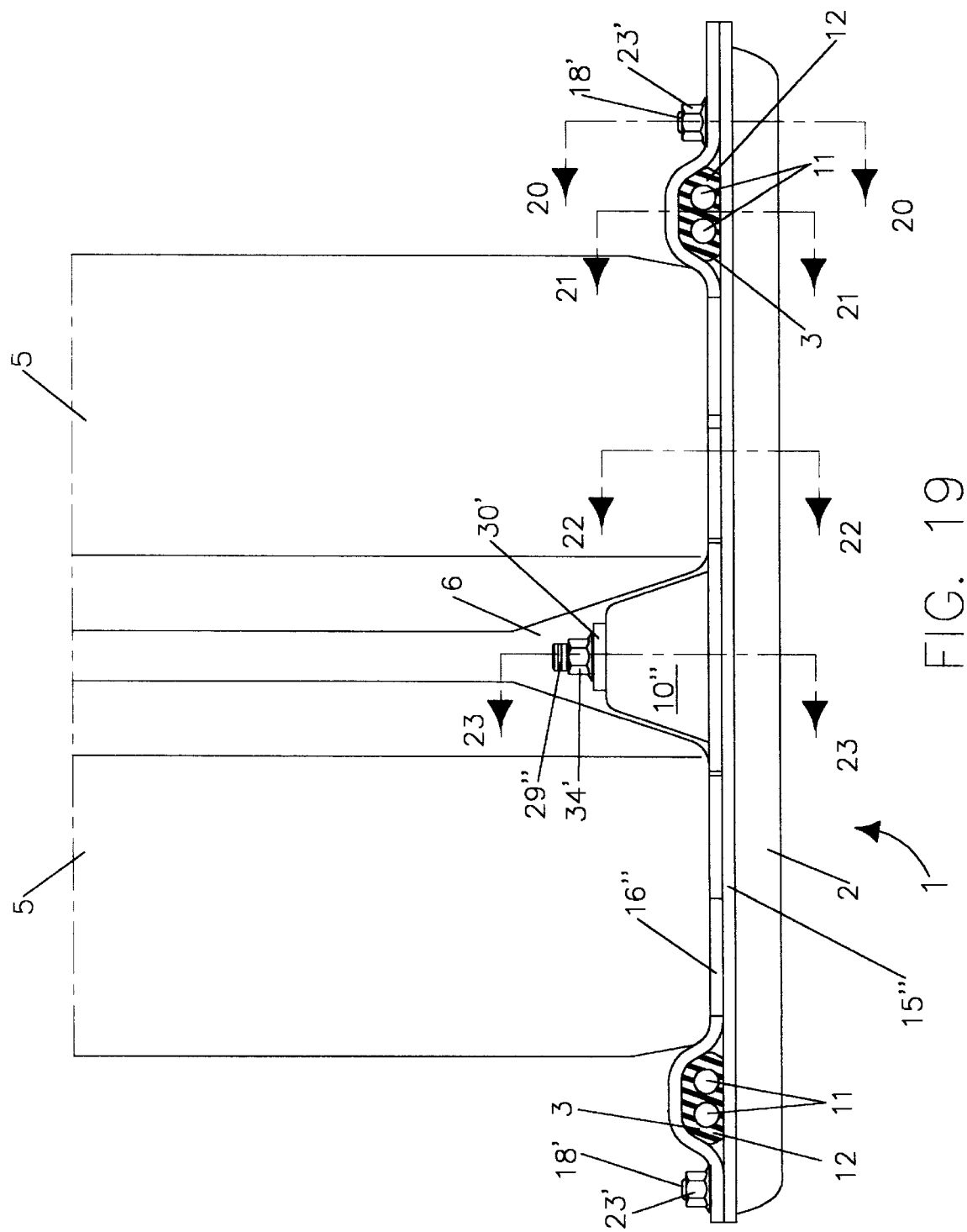
FIG. 19 is a transverse cross section of a tractor tread taken on line 19—19 of FIG. 17.

The tractor endless tread of FIGS. 1 to 10 has been further simplified in the embodiment shown in FIGS. 11 to 16 by elimination of the nuts 23 and 34 shown in FIG. 5 and the rods 25 holding those nuts. Instead, the grouser-mounting base plate 15' has been provided with tapped holes to receive the threaded ends of bolts 18 and 29'. The bolts 29' are shown screwed into the grouser-mounting base plates 15' in FIG. 14. Because of the spacing of bolts 29' lengthwise of the tractor tread, notches 32' are provided for such bolts in the opposite edges of the wire loop clamping strips 16', as shown in FIG. 16.

In order to be able to turn the guide blocks 10' through 90 degrees in the event that such guide blocks become worn, four holes 31' are provided through the guide blocks arranged in two pairs disposed perpendicular to each other, and the guide blocks are of square cross section in the form of a truncated pyramid.

In the form of tractor tread shown in FIGS. 1 to 10, the central tongue-and-groove slip joints between the spacer strips 36 and the clamping strips 16 include the edge portions of the reinforcing strips 17, as shown in FIG. 7. As mentioned above, in the modified form of tractor tread shown in FIGS. 11 to 16, the stiffening strips 17 have been eliminated. Instead, a bottom plate 41 has been provided in which the bottom of the guide block 10' seats. The plate 41 is of a width lengthwise of the tractor tread greater than the width of a clamping strip 16', being sufficient to overlap the margins of the central portions of spacer strips 36', as shown in FIG. 14, to form the inner side of the groove of the tongue-and-groove joint between the opposite edges of the spacer strips 36' and the grouser-mounting structure as shown in FIG. 14.

Figure 12:
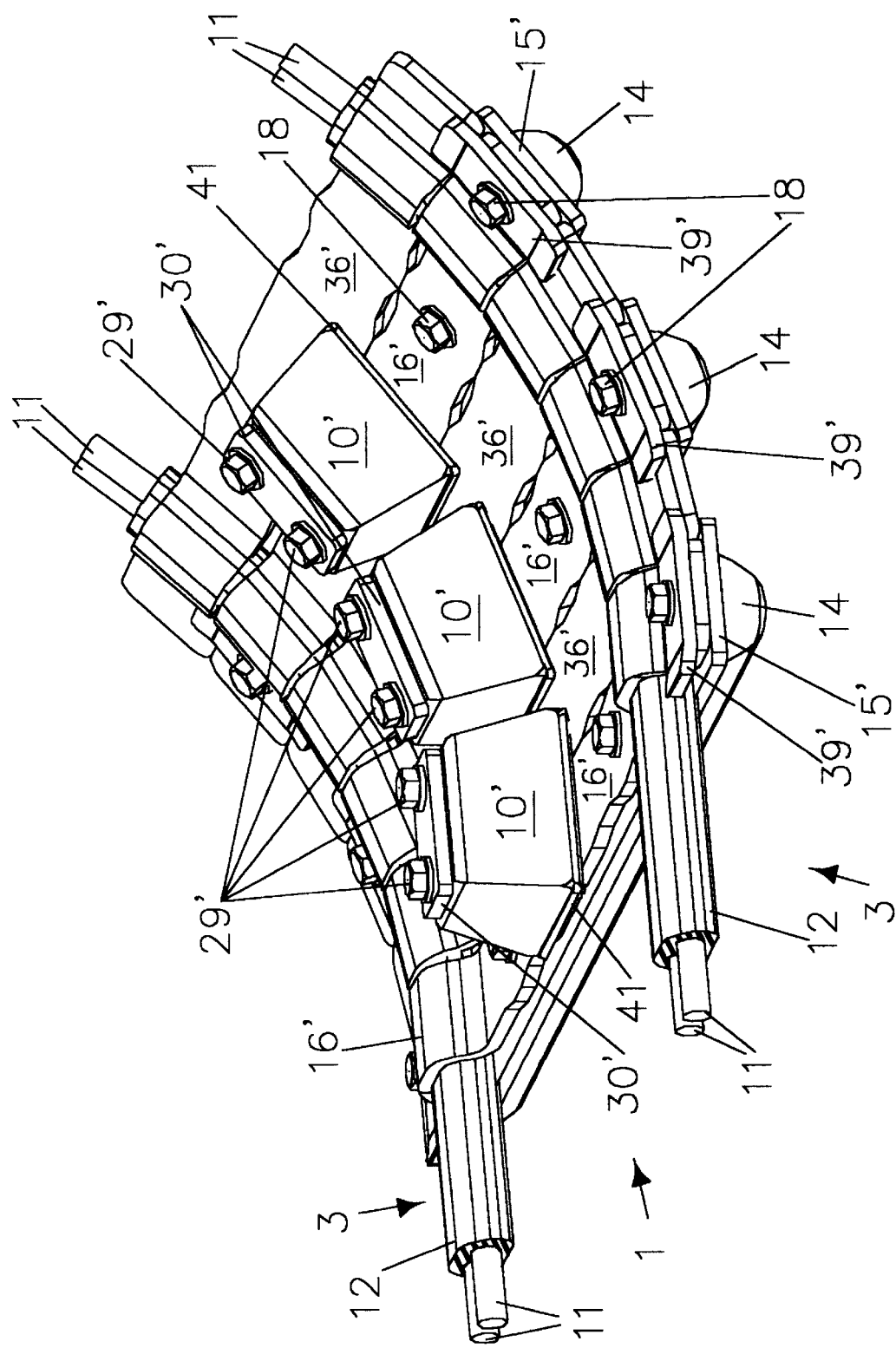
FIG. 12 is a top perspective of a portion of a tractor tread like that shown in FIG. 11.

It will be noted that the opposite margins of the bottom plates 41 for the guide blocks are bent inward so that such margins do not interfere with the tilting of the spacer strips 36' relative to the clamping strips 16' as the tread moves around a wheel, as shown in FIGS. 12 and 15.

Likewise, the opposite margins of the crosspieces 39' are bent inward, as shown in FIGS. 11, 12, 15 and 16. Such bent margins provide clearance between the spacer strips 36' and the crosspieces 39' as an alternative to the chamfering of the margins of the crosspieces 39, as shown in FIG. 10.

Figure 13:
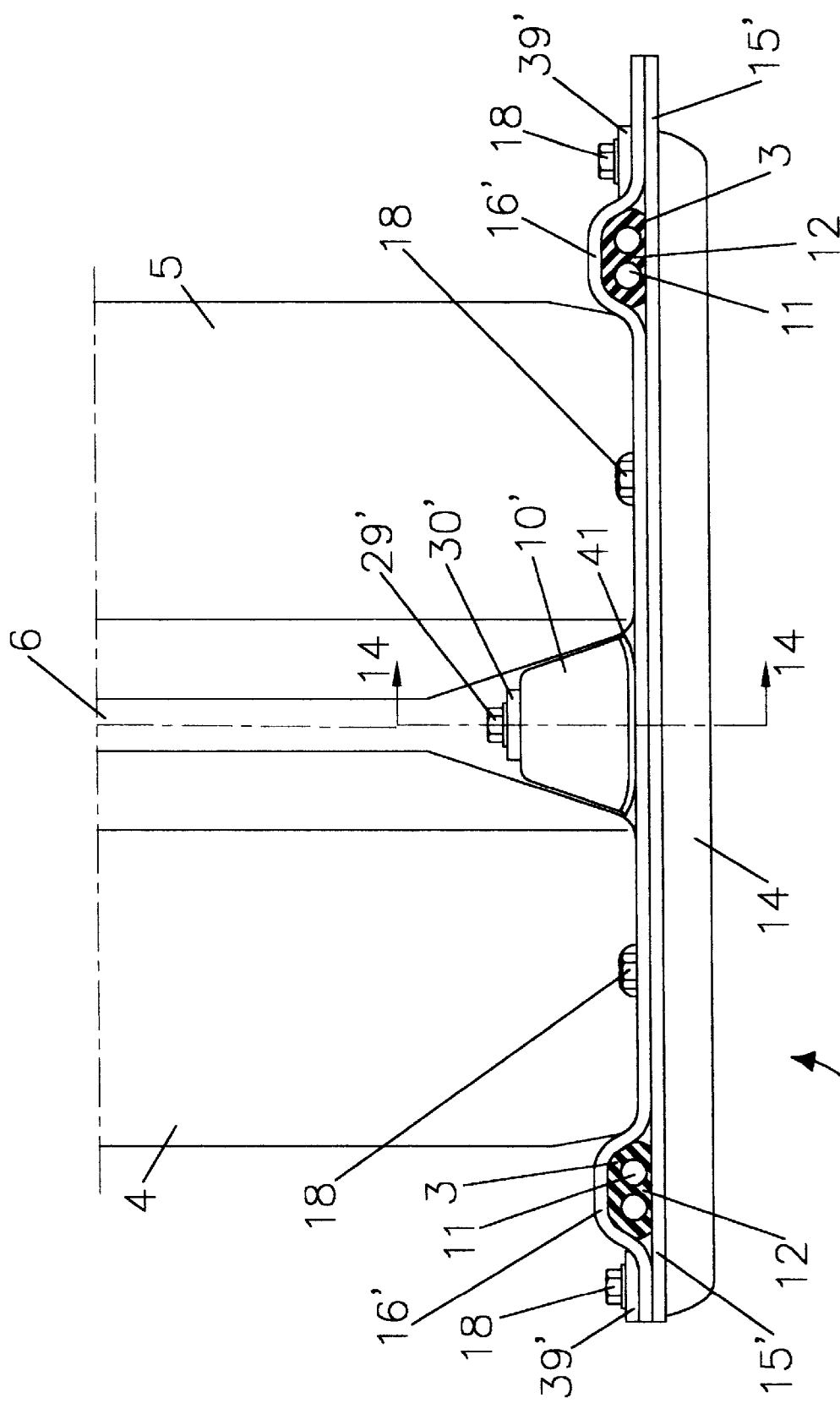
FIG. 13 is a cross section through the tractor tread.

As has been mentioned, different grouser lengths can be selected and, if desired, the end portions of the grouser-mounting base plates 15' and clamping strips 39' can overhang the grouser bars at one end, as shown at the right of FIG. 13.

As stated above, in the modified tractor endless tread structure shown in FIGS. 11 to 16, the stiffening strip 17 for clamp bar 16 has been eliminated, and the stiffening strip 37 for the spacer strip 36 has been eliminated. In the further modified tractor endless tread shown in FIGS. 17 to 26, not only have the stiffening strip 17 and the stiffening strip 37 incorporated in the tractor endless tread shown in FIGS. 1 to 10 been eliminated, but also the spacer strips 36 incorporated in both forms of tractor endless tread described above have been replaced by grouser-mounting base plates 15''', enabling the grousers 2 and grouser-mounting base plates to be disposed much closer together, as shown in FIGS. 17, 18, 20, 21, 22 and 26.

Figure 9:
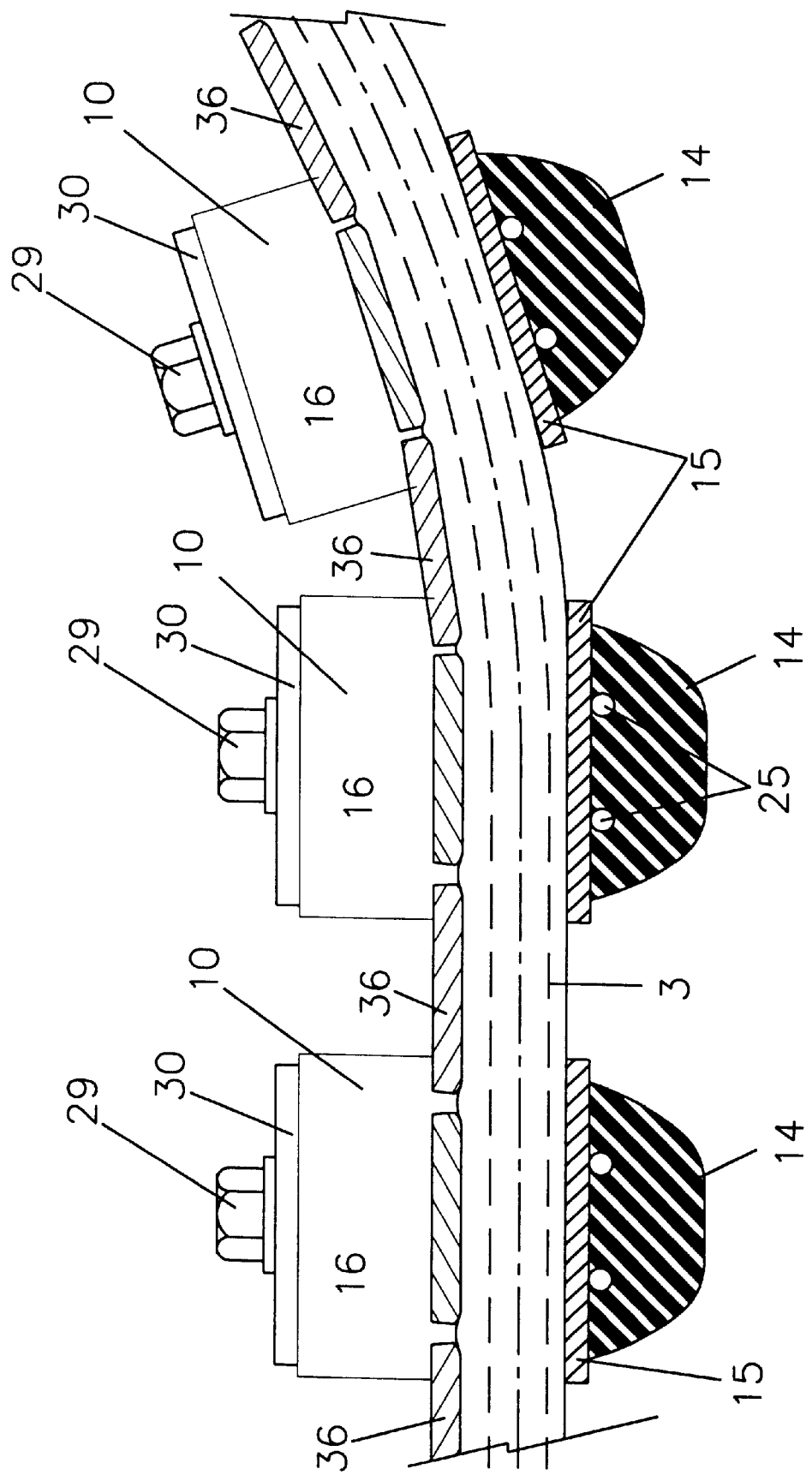

In this further modified form of tractor endless tread, however, guide blocks 10'' are provided only on alternate clamping strips 16'' and are not provided on the intermediate clamping strips 16''' instead of being provided on every clamping strip 16 as shown in the first form of the tread, for instance in FIGS. 7, 8 and 9, and on every clamping strip 16' in the first modified type of tread shown for example, in FIGS. 14 and 15.

Figure 23:
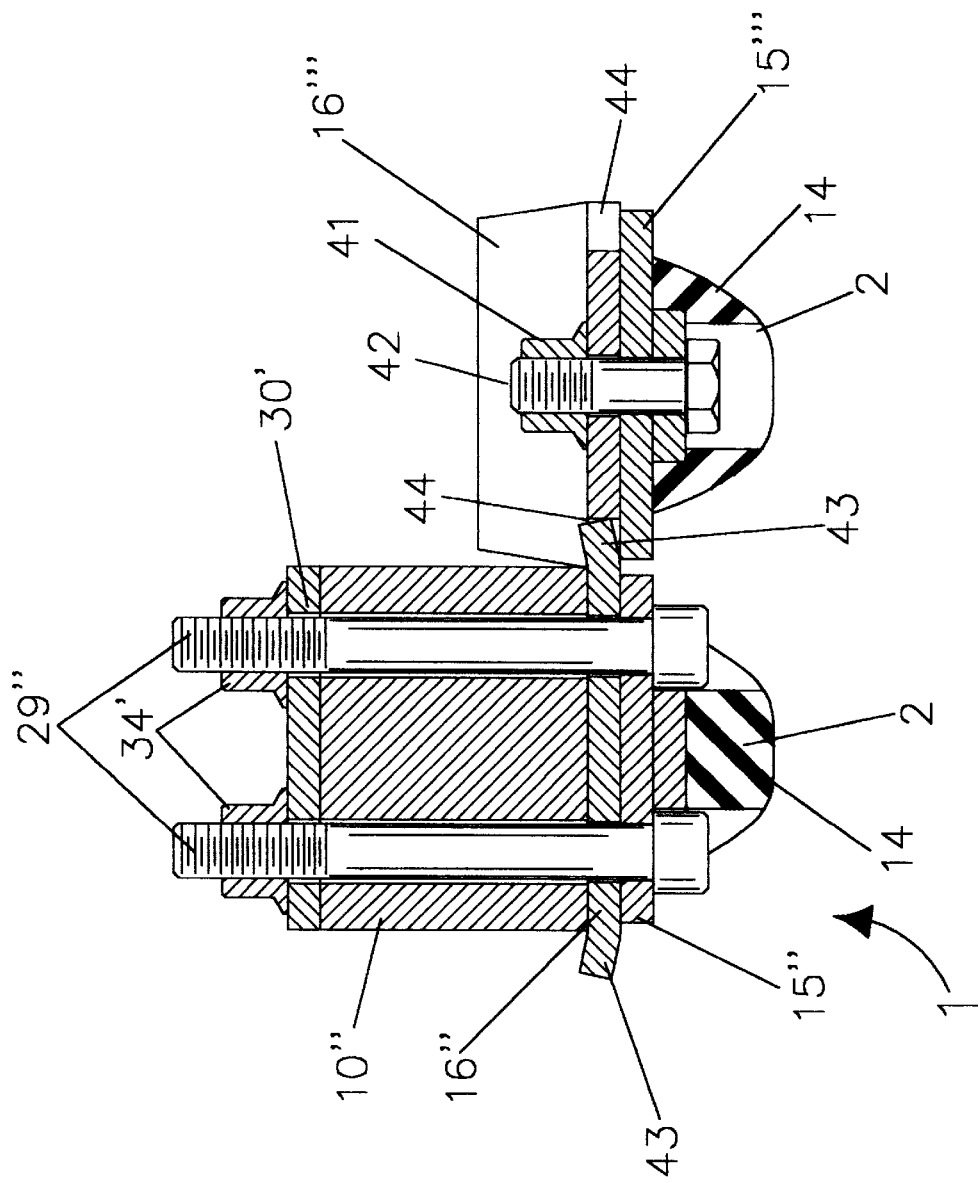

The guide blocks 10'' are still mounted on their respective clamping strips 16'' by two bolts 29'. In this instance, however, the bolts are inserted through holes in the grouser-mounting base plates 15'' and moved inward through the clamping strips 16'', the guide blocks 10'', and the cap plate 30', as shown in FIG. 23. These bolts are secured in place by nuts 34 bearing on the cap plate 30'. The guide blocks loll do not have bottom plates like the plates 41 in the first modified form of the tread shown in FIGS. 13, 14 and 16 but are seated directly on the clamping strips 16'', as shown in FIG. 23.

Each of the clamping strips 16'' overlies a grouser-mounting base plate 15'', and each clamping strip 16''' overlies a grouser-mounting base plate 15'''. Grouser bars 14 are bonded to the grouser-mounting base plates 15'' and 15'''. The clamping strips 16'' are secured to the grouser-mounting base plates 15'' by bolts 18' extending inward through the end portions of the grouser-mounting base plates 15'' and the clamping strips 16'' outboard of the endless loops 3. The intermediate clamping strips 16''' between the clamping strips 16'' are also secured to the intermediate grouser-mounting base plates 15''' by end bolts 18'. The bolts 18' are secured by nuts 23'.

The central portions of the clamping strips 16'' and of the grouser-mounting base plates 15'' are secured together by the bolts 29''. The central portions of the intermediate clamping strips 16''' and the central portions of the intermediate grouser-mounting base plates 15''' are secured together by bolts 42 that extend inward through holes in the grouser-mounting base plates 15''' and registering holes in the central portions of the intermediate clamping strips 16''' . These bolts are secured by nuts bearing on the intermediate clamping strips 16''' .

Because the endless wire loops 3 overlie the end portions of the grouser-mounting base plates 15'' and 15''', and the end portions of the clamping strips 16'' and 16''' overlie the endless loops, securing each clamping strip to its grouser-mounting base plate in the manner described above will ensure that the endless loops will be anchored to the grouser-mounting structure.

Although each grouser-mounting base plate 15'' and 15''' are securely anchored to the endless wire rope loops 3 by the clamping strips 16'' and 16''' as described above, it is desirable for the stress exerted locally on one or more grousers to be distributed over several clamping strip and grouser-mounting base plate assemblies and over greater lengths of the endless wire rope connecting loops 3. For this purpose, shear-transmitting means interconnects the adjacent edge portions of adjacent clamping strips to deter or limit relative lengthwise movement of such adjacent clamping strips.

Such shear-transmitting means includes interfitting complemental projections and sockets or recesses on adjacent edges of adjacent clamping strips. Thus, as shown best in FIG. 25, projections 43 on the edges of clamping strips 16'' will engage in the complemental recesses 44 in the adjacent edges of the intermediate clamping strips 16'''. The complemental projections 43 and recesses 44 will be interfitted when the adjacent clamping strips 16'' and 16''' are moved together from the positions shown in FIG. 25 to the positions shown in FIG. 26.

Each clamping strip 16''' is shown as having two projections 45 on each edge spaced lengthwise of the clamping strip and disposed on opposite sides, respectively, of the recess 44. The clamping strips 16'' have two sockets or recesses 46 on each edge spaced lengthwise of the clamping strip and disposed on opposite sides of a projection 43.

Figure 25:
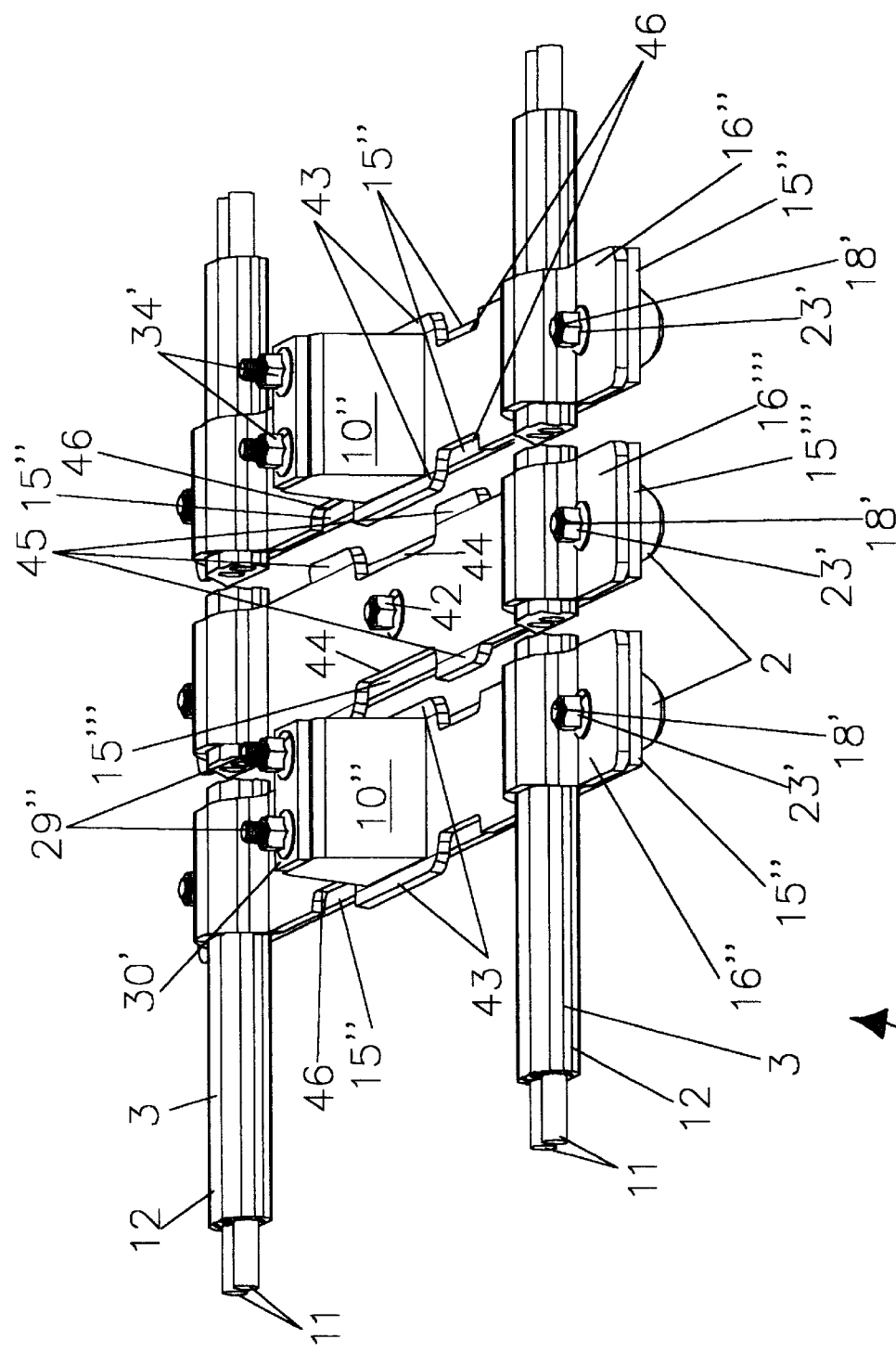
FIG. 25 is a top perspective of a portion of the tractor tread of the type shown in FIG. 17 with adjacent grouser components shown spaced apart from their operative relationship.
Figure 26:
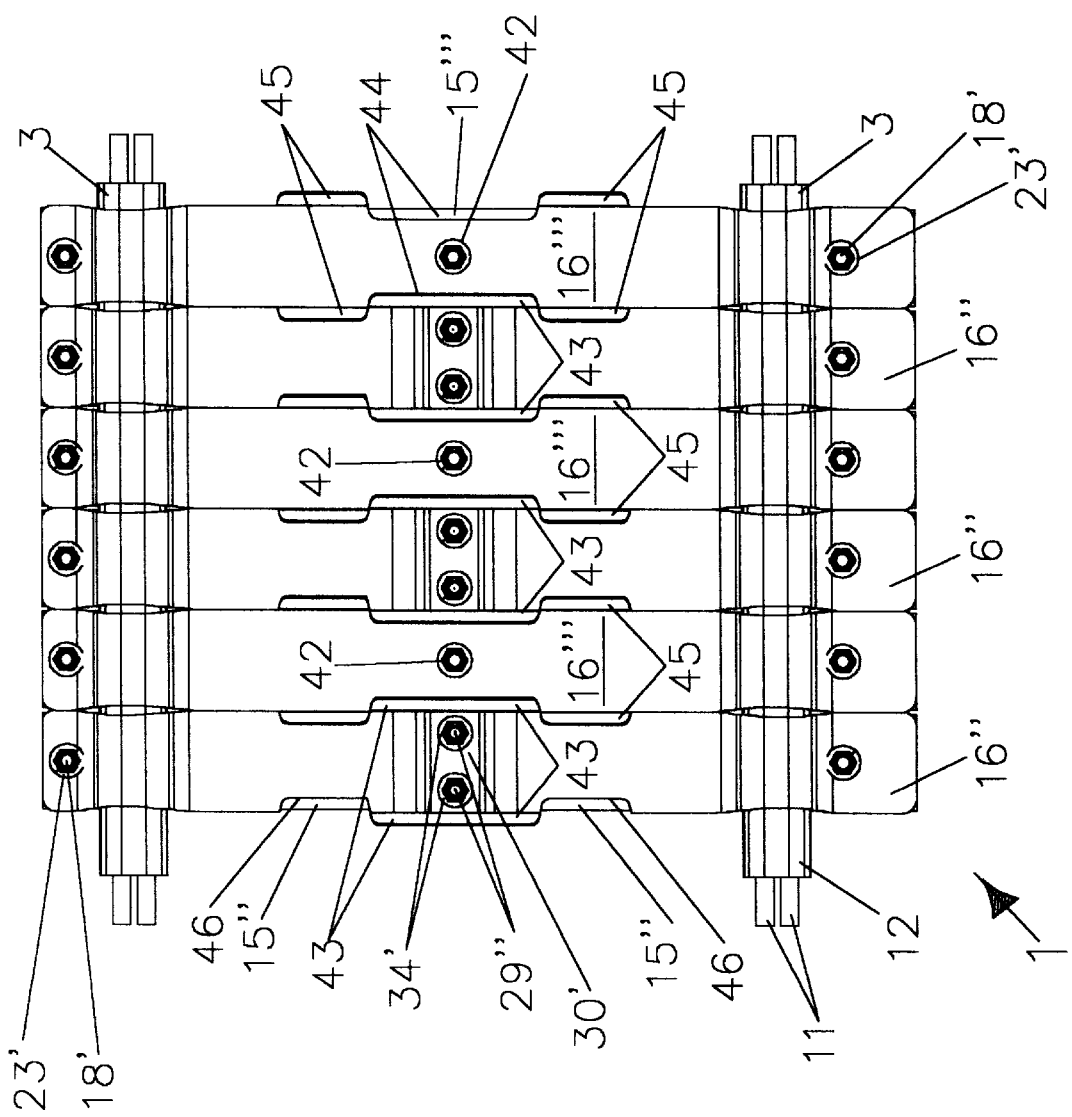
FIG. 26 is a plan of a section of tractor tread of the type shown in FIG. 17.

The edge projections 45 on the clamping strips 16''' are complemental to and can interfit with the sockets or recesses 46 in the edges of clamping strips 16'' and the projections 42 on clamping strips 16'' are complemental to and can interfit with the sockets 44 in the edges of clamping strips 16''' as shown in FIGS. 25 and 26. Thus there will be a plurality of interengaged projections and sockets or recesses between all adjacent clamping strips.

It is preferred that the sockets or recesses be open inwardly but closed outwardly. Thus the recesses 44 in the opposite edges of the clamping strips 16''' are sufficiently deep to expose the margin of the grouser-mounting base plate 15''' outwardly of such recess. Similarly, each recess 46 in the opposite edges of clamping strips 16'' are sufficiently deep to expose marginal portions of grouser-mounting base plates 15'' on the outer side of each recess 46.

Figure 20:
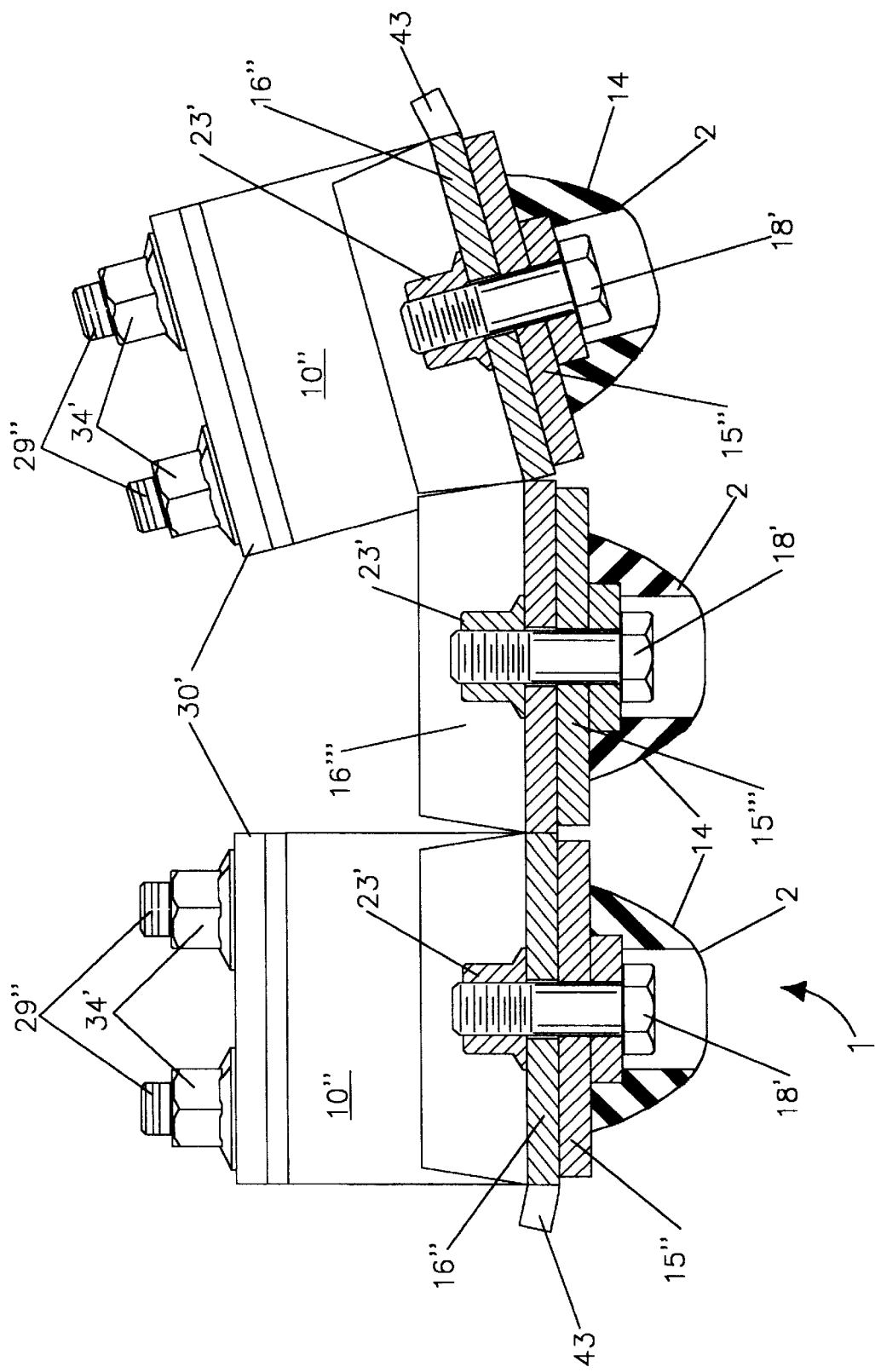
FIGS. 20, 21, 22 and 23 are sections through a portion of a tractor tread taken on lines 20—20, 21—21, 22—22 and 23—23, respectively, shown in FIG. 19.
Figure 21:
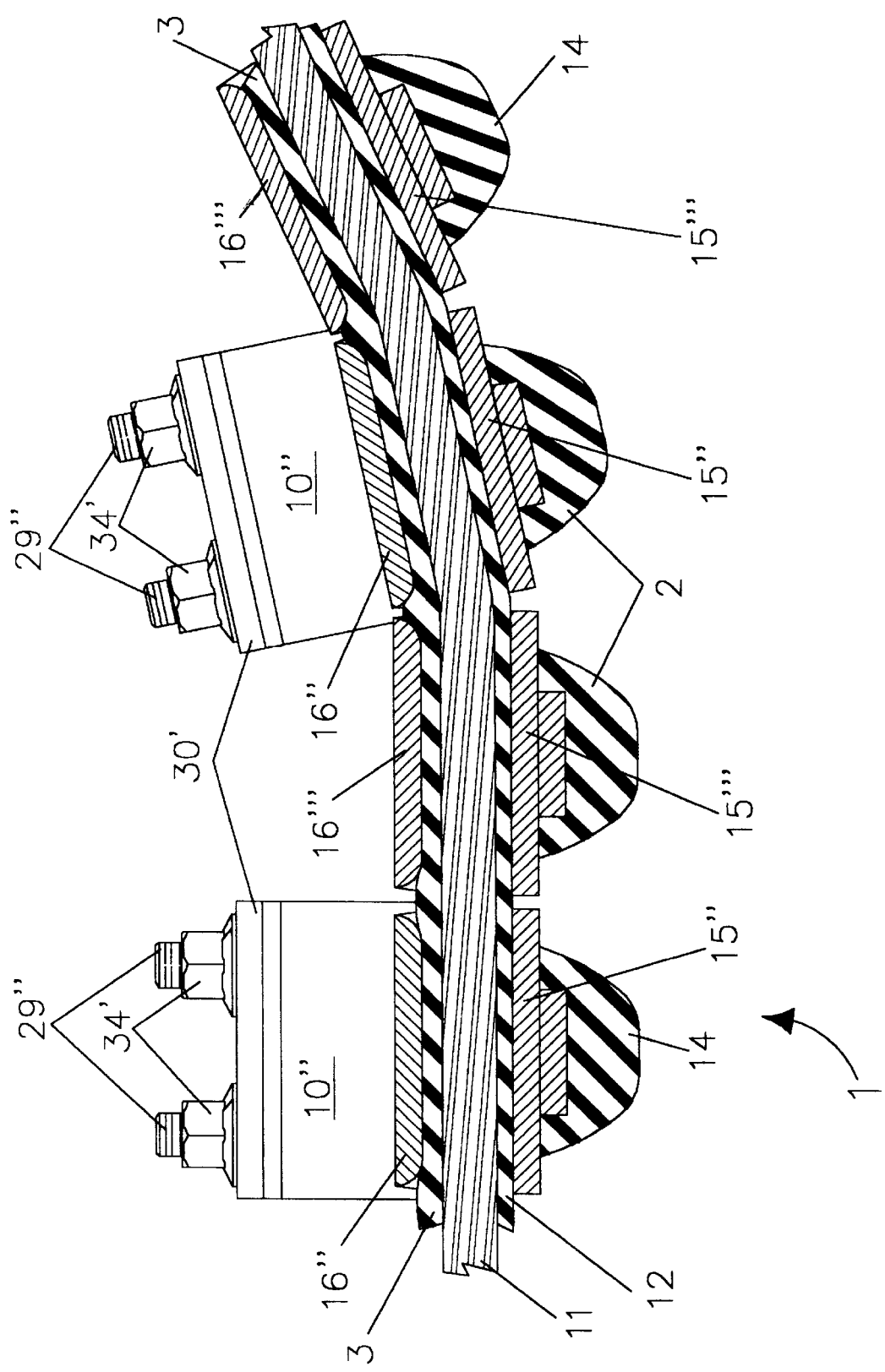
Figure 22:
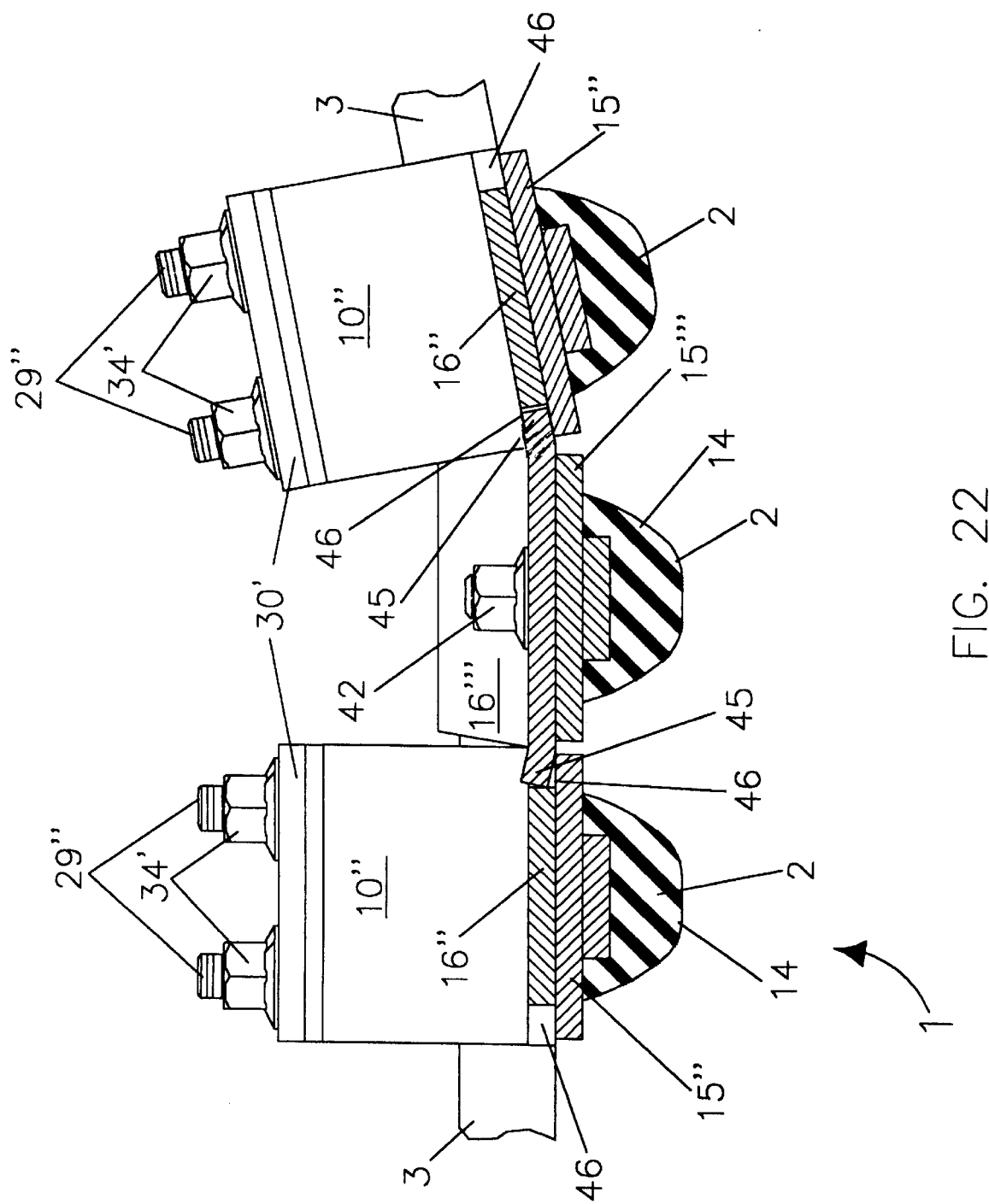
Figure 24:
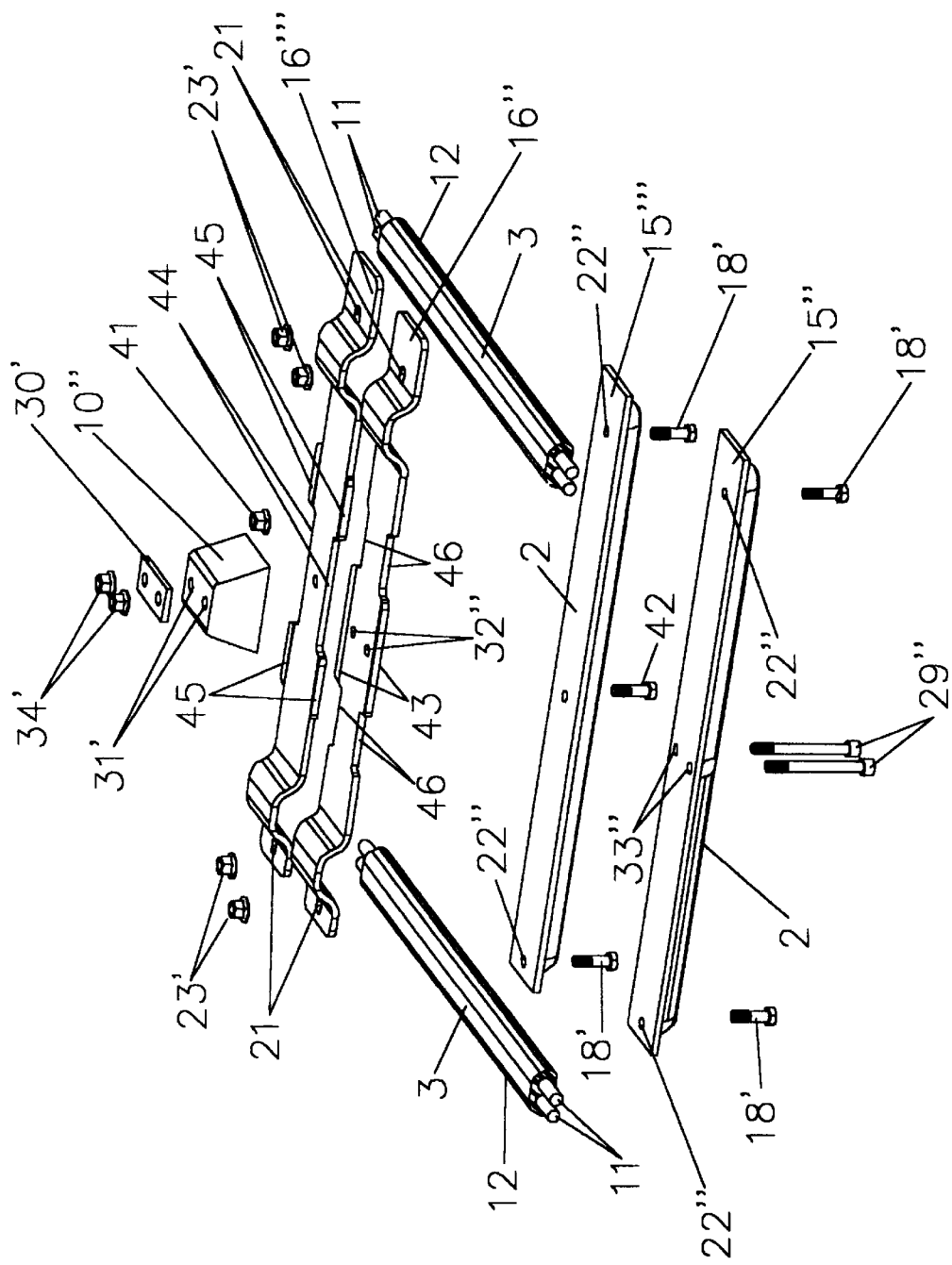
FIG. 24 is a top perspective of the tractor tread retaining structure for integrating the grousers and grouser-connecting wire rope loops of the tread type shown in FIG. 17, parts being shown in exploded relationship.

Each projection 43 on an edge of a clamping strip 16'' and each projection 45 on an edge of a clamping strip 16''' is bent somewhat inward as shown in FIGS. 20, 24 and 25 so as to enable the adjacent clamping strips 16'' and 16''' to tilt a limited amount relatively as shown in FIGS. 21 and 22 when the endless track bends in rounding a tractor-mounted wheel which the tread engages.

I claim:

1. In a tractor endless tread, including an endless string of grouser-mounting base plates, two endless wire rope loops overlying the grouser-mounting base plates, clamping strips overlying the grouser-mounting base plates, respectively, and engageable with the endless loops, and means for securing each clamping strip to its grouser-mounting base plate for anchoring the endless loops to the grouser-mounting base plates, the improvement comprising shear-transmitting means engageable between adjacent clamping strips for transmitting shear load from one of such clamping strips to the other such clamping strip, the shear-transmitting means including a projection on the edge of one clamping strip and a socket on the adjacent edge of the adjacent clamping strip engageable by said projection, one adjacent edge of a first adjacent clamping strip having a projection and having sockets on opposite sides of said projection and the adjacent edge of a second adjacent clamping strip having a socket and having projections on opposite sides of said socket, said projection of said first clamping strip interfitting with said socket of said second clamping strip and each projection of said second clamping strip interfitting with a socket on the adjacent edge of said first clamping strip.

2. In the tractor tread defined in claim 1, each of the adjacent edges of adjacent clamping strips having a projection and a socket with the projection of one clamping strip edge engaged in the socket of the adjacent clamping strip adjacent edge.

3. In the tractor tread defined in claim 1, each socket being a recess in a clamping strip edge and the grouser-mounting base plate having a margin underlying such clamping strip and underlying such recess.

4. In a tractor tread defined in claim 1, a first clamping strip having projections in the central portions of its opposite edges and a second clamping strip having sockets in the central portions of its opposite edges complemental to and interfitting with the projections of said first clamping strip.

5. In the tractor tread defined in claim 4, a guide block mounted on the central portion of the first clamping strip engagable with a wheel of a tractor.

* * * * *